US010120565B2

(12) United States Patent
Snibbe et al.

(10) Patent No.: US 10,120,565 B2
(45) Date of Patent: Nov. 6, 2018

(54) METHODS AND DEVICES FOR PRESENTING INTERACTIVE MEDIA ITEMS

(71) Applicant: Facebook, Inc., Menlo Park, CA (US)

(72) Inventors: Scott Snibbe, San Francisco, CA (US); Graham McDermott, Berkeley, CA (US); Justin Ponczek, San Francisco, CA (US); Spencer Schoeben, Palo Alto, CA (US); Jesse Fulton, San Francisco, CA (US)

(73) Assignee: FACEBOOK, INC., Menlo Park, CA (US)

(*) Notice: Subject to any disclaimer, the term of this patent is extended or adjusted under 35 U.S.C. 154(b) by 395 days.

(21) Appl. No.: 14/933,940

(22) Filed: Nov. 5, 2015

(65) Prior Publication Data
US 2016/0054916 A1 Feb. 25, 2016

Related U.S. Application Data

(63) Continuation of application No. 14/608,103, filed on Jan. 28, 2015, now Pat. No. 9,207,857.
(Continued)

(51) Int. Cl.
*G06F 3/0484* (2013.01)
*G06F 3/0488* (2013.01)
(Continued)

(52) U.S. Cl.
CPC ........ *G06F 3/04883* (2013.01); *G06F 3/0412* (2013.01); *G06F 3/0481* (2013.01);
(Continued)

(58) Field of Classification Search
CPC . G06F 3/04883; G06F 3/0412; G06F 3/04842
See application file for complete search history.

(56) References Cited

U.S. PATENT DOCUMENTS 6,493,872 B1 12/2002 Rangan
8,209,723 B2 6/2012 Sakaguchi et al.
(Continued)

FOREIGN PATENT DOCUMENTS

EP 2575131 A1 4/2013
EP 3100182 12/2016
(Continued)

OTHER PUBLICATIONS

U.S. Appl. No. 14/608,097, First Action Interview Pilot Program Pre-Interview Communication dated Sep. 8, 2015, 5 pages.
(Continued)

*Primary Examiner* — Omar R Abdul-Ali
(74) *Attorney, Agent, or Firm* — Kilpatrick Townsend & Stockton LLP

(57) ABSTRACT

The various embodiments described herein include methods and systems for presenting interactive media items. In one aspect, a method includes publishing, by a server system, an interactive media item, the publishing comprising providing access for a playback of the interactive media item based on metadata for the interactive media item. The metadata is generated using information associated with the interactive media item and including a mapping of an effect parameter for a first effect of the one or more effects to a touch input gesture. Playback includes, in response to detecting a first user input gesture corresponding to the touch input gesture, applying the first effect to the presented interactive media item. The applying of the first effect includes determining the effect parameter according to one or more characteristics of the first user input gesture, based on the mapping of the effect parameter to the touch input gesture.

21 Claims, 22 Drawing Sheets

Related U.S. Application Data

(60) Provisional application No. 61/940,262, filed on Feb. 14, 2014.

(51) Int. Cl.

| | | |
|---|---|---|
| *G06F 3/0481* | (2013.01) | |
| *G06Q 30/02* | (2012.01) | |
| *G06F 3/041* | (2006.01) | |
| *G06F 3/16* | (2006.01) | |
| *G06T 11/60* | (2006.01) | |
| *G11B 27/031* | (2006.01) | |

(52) U.S. Cl.
CPC ........ *G06F 3/0488* (2013.01); *G06F 3/04842* (2013.01); *G06F 3/04845* (2013.01); *G06F 3/04847* (2013.01); *G06F 3/165* (2013.01); *G06Q 30/0241* (2013.01); *G06T 11/60* (2013.01); *G11B 27/031* (2013.01)

(56) References Cited

U.S. PATENT DOCUMENTS

| | | |
|---|---|---|
| 8,258,390 B1 | 9/2012 | Gossweiler et al. |
| 8,594,714 B2 | 11/2013 | Wu |
| 8,745,500 B1 | 6/2014 | Kostello et al. |
| 8,806,320 B1 | 8/2014 | Abdo |
| 8,996,538 B1 | 3/2015 | Cremer et al. |
| 9,116,912 B1 | 8/2015 | Snibbe et al. |
| 9,207,844 B2 | 12/2015 | Snibbe et al. |
| 9,207,857 B2 | 12/2015 | Snibbe et al. |
| 9,268,787 B2 | 2/2016 | Snibbe et al. |
| 9,519,644 B2 | 12/2016 | Snibbe et al. |
| 2004/0095379 A1 | 5/2004 | Chang et al. |
| 2004/0096379 A1 | 5/2004 | Furste et al. |
| 2005/0078947 A1 | 4/2005 | Chung |
| 2006/0005143 A1 | 1/2006 | Sakkinen et al. |
| 2006/0064716 A1 | 3/2006 | Sull et al. |
| 2006/0212478 A1 | 9/2006 | Plastina et al. |
| 2007/0061724 A1 | 3/2007 | Slothouber et al. |
| 2007/0188657 A1 | 8/2007 | Basson et al. |
| 2007/0204003 A1 | 8/2007 | Abramson |
| 2007/0250896 A1 | 10/2007 | Parker et al. |
| 2008/0092047 A1 | 4/2008 | Fealkoff et al. |
| 2008/0136940 A1 | 6/2008 | Srikanth et al. |
| 2008/0208692 A1 | 8/2008 | Garaventi et al. |
| 2008/0209482 A1 | 8/2008 | Meek et al. |
| 2008/0256086 A1 | 10/2008 | Miyoshi et al. |
| 2008/0274687 A1 | 11/2008 | Roberts et al. |
| 2009/0100361 A1 | 4/2009 | Abello et al. |
| 2009/0150797 A1 | 6/2009 | Burkholder et al. |
| 2009/0271283 A1 | 10/2009 | Fosnacht |
| 2010/0223128 A1 | 9/2010 | Dukellis et al. |
| 2010/0223314 A1 | 9/2010 | Gadel |
| 2011/0066940 A1 | 3/2011 | Kamrani et al. |
| 2011/0163969 A1 | 7/2011 | Anzures et al. |
| 2012/0026397 A1 | 2/2012 | Gummagatta |
| 2012/0233644 A1 | 9/2012 | Rao |
| 2012/0254925 A1 | 10/2012 | Nassiri |
| 2013/0047081 A1 | 2/2013 | Long et al. |
| 2013/0070093 A1 | 3/2013 | Rivera |
| 2013/0311886 A1* | 4/2013 | Ku ....................... G06F 3/0484 715/719 |
| 2013/0117692 A1 | 5/2013 | Padmanabhan et al. |
| 2013/0218942 A1 | 9/2013 | Willis et al. |
| 2013/0238696 A1 | 9/2013 | Cotelo |
| 2013/0254708 A1* | 9/2013 | Dorcey ................. H04L 51/04 715/788 |
| 2013/0263016 A1* | 10/2013 | Lehtiniemi ........... G06T 19/006 715/753 |
| 2013/0273968 A1 | 10/2013 | Rhoads et al. |
| 2014/0040742 A1 | 2/2014 | Park et al. |
| 2014/0074712 A1 | 3/2014 | Palmer et al. |
| 2014/0115469 A1 | 4/2014 | Pendergast et al. |
| 2014/0229831 A1* | 8/2014 | Chordia ................ G06F 3/0482 715/717 |
| 2014/0237365 A1* | 8/2014 | Oberbrunner .......... G11B 27/34 715/722 |
| 2015/0066780 A1 | 3/2015 | Cohen et al. |
| 2015/0067514 A1 | 3/2015 | Lewis et al. |
| 2015/0067726 A1 | 3/2015 | Glasser |
| 2015/0220249 A1 | 8/2015 | Snibbe et al. |
| 2015/0220558 A1 | 8/2015 | Snibbe et al. |
| 2015/0221339 A1 | 8/2015 | Snibbe et al. |
| 2015/0234564 A1 | 8/2015 | Snibbe et al. |
| 2015/0286716 A1 | 10/2015 | Snibbe et al. |
| 2015/0324096 A1* | 11/2015 | Leblanc ............... G11B 27/034 715/720 |
| 2015/0339295 A1 | 11/2015 | Snibbe et al. |
| 2015/0341707 A1 | 11/2015 | Snibbe et al. |
| 2016/0011749 A1* | 1/2016 | Voss ................. H04N 21/41407 715/726 |
| 2016/0054873 A1 | 2/2016 | Snibbe et al. |
| 2016/0173960 A1 | 6/2016 | Snibbe et al. |
| 2017/0040039 A1 | 2/2017 | Snibbe et al. |
| 2017/0325007 A1 | 11/2017 | Snibbe et al. |

FOREIGN PATENT DOCUMENTS

| | | |
|---|---|---|
| EP | 3100268 | 12/2016 |
| WO | WO2011/066432 A2 | 6/2011 |
| WO | 2015116839 | 8/2015 |
| WO | 2015116841 | 8/2015 |

OTHER PUBLICATIONS

U.S. Appl. No. 14/608,097, Notice of Allowance dated Oct. 14, 2015, 11 pages.
U.S. Appl. No. 14/608,099, Non-Final Office Action dated Apr. 20, 2015, 14 pages.
U.S. Appl. No. 14/608,099, Notice of Allowance dated Aug. 6, 2015, 8 pages.
U.S. Appl. No. 14/608,103, Notice of Allowance dated Aug. 11, 2015, 19 pages.
U.S. Appl. No. 14/608,103, Pre-Interview First Office Action dated Apr. 30, 2015, 5 pages.
U.S. Appl. No. 14/608,105, Notice of Allowance dated Mar. 27, 2015, 9 pages.
U.S. Appl. No. 14/608,108, Final Office Action dated Feb. 26, 2016, 11 pages.
U.S. Appl. No. 14/608,108, Final Office Action dated Aug. 14, 2015, 12 pages.
U.S. Appl. No. 14/608,108, Non-Final Office Action dated Nov. 12, 2015, 14 pages.
U.S. Appl. No. 14/608,108, Notice of Allowance dated Jul. 15, 2016, 7 pages.
U.S. Appl. No. 14/608,108, Pre-Interview First Office Action dated Mar. 26, 2015, 5 pages.
U.S. Appl. No. 14/816,984, Non-Final Office Action dated Jun. 15, 2017, 7 pages.
U.S. Appl. No. 14/820,477, Final Office Action dated Feb. 9, 2017, 20 pages.
U.S. Appl. No. 14/820,477, Final Office Action dated Sep. 29, 2017, 22 pages.
U.S. Appl. No. 14/820,477, Non-Final Office Action dated Jun. 17, 2016, 16 pages.
U.S. Appl. No. 14/820,477, Non-Final Office Action dated Apr. 26, 2017, 20 pages.
U.S. Appl. No. 15/051,618, Non-Final Office Action dated Sep. 6, 2017, 18 pages.
U.S. Appl. No. 15/297,062, Non-Final Office Action dated Sep. 25, 2017, 7 pages.
Canadian Application No. 2,975,411, Office Action dated Sep. 15, 2017, 7 pages.
European Application No. 12820426.0, Supplemental European Search Report dated Feb. 27, 2015, 6 pages.
European Application No. 15705155.8, Communication Pursuant to Rules 161(2) and 162 dated Sep. 28, 2016, 2 pages.
International Application No. PCT/US2015/013568, International Preliminary Report on Patentability dated Aug. 11, 2016, 7 pages.

(56) References Cited

OTHER PUBLICATIONS

"Create your own music video with video star". Bakari Chavanu. Retrieved from the wayback machine dated Jun. 13, 2012. Available at: http://web.archive.org/web/20120613172308/http://www.makeuseof.com/tag/create-your-own-music-video-with- video-star/ 16 pgs.

Eyegroove, Inc., International Search Report and Written Opinion, PCT/US2015/013568, dated Apr. 14, 2015, 8 pgs.

Eyegroove, Inc., International Search Report and Written Opinion, PCT/US2015/013570, dated May 20, 2015, 11 pgs.

Handler, A., "iMovie for iPhone," Jan. 24, 2013, downloaded from http://examples.oreilly.com/9781449393656/iMovie_for_iPhone, 11 pgs.

U.S. Appl. No. 14/816,984, Final Office Action dated Dec. 8, 2017, 7 pages.

Canadian Application No. 2,975,416, Notice of Allowance dated Nov. 21, 2017, 1 page.

U.S. Appl. No. 14/820,477, Non-Final Office Action dated Jan. 12, 2018, 21 pages.

U.S. Appl. No. 15/297,062, Notice of Allowance dated Jan. 16, 2018, 8 pages.

U.S. Appl. No. 15/297,062, Corrected Notice of Allowance dated Feb. 13, 2018, 5 pages.

Eyegroove, Inc., Communication Pursuant to Rules 161(2) and 162, EP15705154.1, dated Sep. 20, 2016, 2 pgs.

Eyegroove, Inc., International Preliminary Report on Patentability, PCT/US2015/013570, dated Aug. 2, 2016, 8 pgs.

\* cited by examiner

Metadata Structure 510

| id tag 512 |
|---|
| author 514 |
| date/time 516 |
| media file pointer(s) 518 |
| audio track pointer(s) 520 |
| audio start time(s) 521 |
| effects table 522 |
| <user, effect type, effect version, content, t1, t2, p1, p2, ..., effect script> 523-a |
| ⋮ |
| interactive effects table 524 |
| <user, effect type, effect version, content, p1, p2, ..., mapping table, effect script> 525-a |
| ⋮ |
| play count 526 |
| <user, date, time, loc, ...> 528-a |
| ⋮ |
| likes 530 |
| <user, date, time, loc, ...> 532-a |
| ⋮ |
| shares 534 |
| <user, method, date, time, loc, ...> 536-a |
| ⋮ |
| comments 538 |
| <user, comment, date, time, loc, ...> 540-a |
| ⋮ |
| associated media items 542 |
| <id tag, user, date, time, loc, ...> 544-a |
| ⋮ |
| ⋮ |

Figure 5

METHODS AND DEVICES FOR PRESENTING INTERACTIVE MEDIA ITEMS

The present application is a continuation of U.S. patent application Ser. No. 14/608,103, filed Jan. 28, 2015, entitled "Methods and Devices for Presenting Interactive Media Items," which itself claims priority to U.S. Provisional Patent Application No. 61/940,262, filed Feb. 14, 2014, both of which are hereby expressly incorporated by reference in their entirety.

This application is related to U.S. patent application Ser. No. 14/608,097, filed Jan. 28, 2015, entitled "Methods and Devices for Synchronizing and Sharing Media Items," U.S. patent application Ser. No. 14/608,099, filed Jan. 28, 2015, entitled "Methods and Devices for Touch-Based Media Creation," U.S. patent application Ser. No. 14/608,105, filed Jan. 28, 2015, entitled "Methods and Devices for Modifying Pre-Existing Media Items," and U.S. patent application Ser. No. 14/608,108, filed month day, 2015, entitled "Methods and Devices for Generating Media Items," which are hereby incorporated by reference in their entirety.

TECHNICAL FIELD

The present invention relates to the field of Internet technologies, and more particularly to presenting interactive media items.

BACKGROUND OF THE INVENTION

As wireless networks and the processing power of mobile devices have improved, web-based applications increasingly allow everyday users to create original content in real-time without professional software. For example, Instagram and Vine allow a user to create original media content that is personalized to the user's tastes—anytime and anywhere. Despite the advances in the provision of web-based media creation applications, some solutions for creating media content are clumsy or ill-suited to future improvements in provisioning media content.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to present interactive media items.

In some embodiments, a method of presenting interactive media items is performed at a client device (e.g., client device 104, FIGS. 1-2) with one or more processors, memory, and a touch screen display. The method includes presenting a media item on the touch screen display, where the media item is associated with a metadata structure that includes first information identifying at least a portion of an audio track, second information identifying one or more media files, and third information identifying one or more audio and/or video effects. The presenting includes: displaying one or more media files associated with the media item; and, while displaying the one or more media files, playing back at least a portion of an audio track associated with the media item, where playback of at least the portion of the audio track is synchronized with the one or more media files. While presenting the media item, the method also includes: detecting a touch input gesture on the touch screen display; and, in response to detecting the touch input gesture, applying an audio and/or video effect specified by the third information to the audio track being played back and/or at least a portion of the one or more media files being displayed.

In some embodiments, an electronic device (e.g., client device 104, FIGS. 1-2) includes one or more processors, a touch screen display, and memory storing one or more programs for execution by the one or more processors, the one or more programs include instructions for performing the operations of any of the methods described herein. In some embodiments, a non-transitory computer readable storage medium storing one or more programs, the one or more programs comprising instructions, which, when executed by an electronic device (e.g., client device 104, FIGS. 1-2) with one or more processors and a touch screen display, cause the electronic device to perform the operations of any of the methods described herein.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

FIG. 5 is a diagram of a representative metadata structure for a respective media item in accordance with some embodiments.

Figure 1:
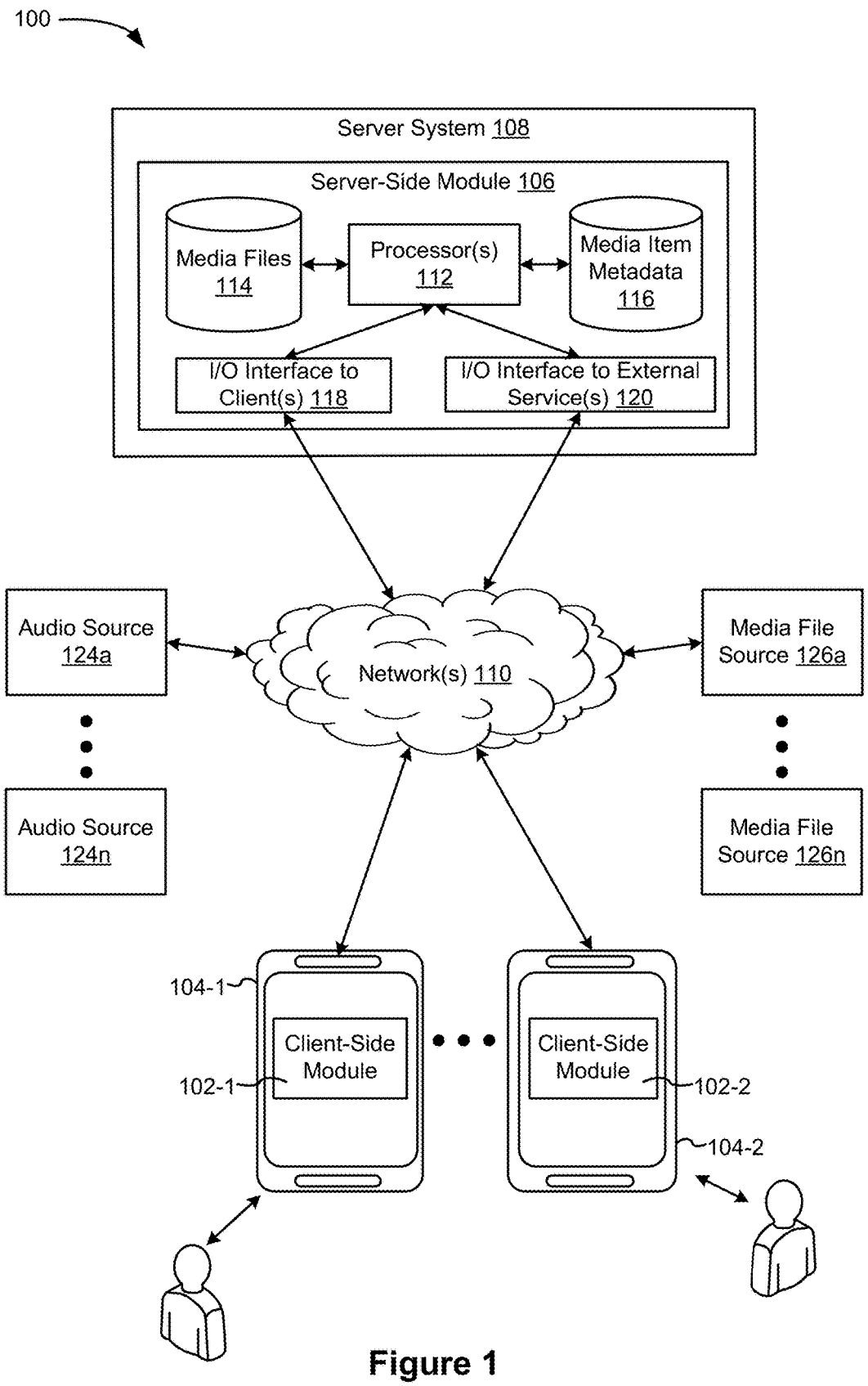
FIG. 1 is a block diagram of a server-client environment in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

As shown in FIG. 1, an application for generating, exploring, and presenting media items is implemented in a server-client environment 100 in accordance with some embodiments. In some embodiments, the application includes client-side processing 102-1, 102-2 (hereinafter "client-side module 102") executed on a client device 104-1, 104-2 and server-side processing 106 (hereinafter "server-side module 106") executed on a server system 108. Client-side module 102 communicates with server-side module 106 through one or more networks 110. Client-side module 102 provides client-side functionalities associated with the application (e.g., creation and presentation of media items) such as client-facing input and output processing and communications with server-side module 106. Server-side module 106 provides server-side functionalities associated with the application (e.g., generating metadata structures for, storing portions of, and causing/directing presentation of media items) for any number of client modules 102 each residing on a respective client device 104.

In some embodiments, server-side module 106 includes one or more processors 112, media files database 114, media item metadata database 116, an I/O interface to one or more clients 118, and an I/O interface to one or more external services 120. I/O interface to one or more clients 118 facilitates the client-facing input and output processing for server-side module 106. One or more processors 112 receive requests from client-side module 102 to create media items or obtain media items for presentation. Media files database 114 stores media files, such as images and/or video clips, associated with media items, and media item metadata database 116 stores a metadata structure for each media item, where each metadata structure associates one or more media files and at least a portion of an audio track with a media item. In some embodiments, media files database 114 and media item metadata database 116 are communicatively coupled with but located remotely from server system 116. In some embodiments, media files database 114 and media item metadata database 116 are located separately from one another. In some embodiments, server-side module 106 communicates with one or more external services such as audio sources 124a . . . 124n (e.g., streaming audio service providers such as Spotify, SoundCloud, Rdio, Pandora, and the like) and media file sources 126a . . . 126n (e.g., service provider of images and/or video such as YouTube, Vimeo, Vine, Flickr, Imgur, and the like) through one or more networks 110. I/O interface to one or more external services 120 facilitates such communications.

Examples of client device 104 include, but are not limited to, a handheld computer, a wearable computing device (e.g., Google Glass or a smart watch), a biologically implanted computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 110 include local area networks ("LAN") and wide area networks ("WAN") such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), WiMAX, or any other suitable communication protocol.

In some embodiments, server system 108 is managed by the provider of the application for generating, exploring, and presenting media items. Server system 108 is implemented on one or more standalone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108.

Although server-client environment 100 shown in FIG. 1 includes both a client-side portion (e.g., client-side module 102) and a server-side portion (e.g., server-side module 106), in some embodiments, the application is implemented as a standalone application installed on client device 104. In addition, the division of functionalities between the client and server portions can vary in different embodiments. For example, in some embodiments, client-side module 102 is a thin-client that provides only user-facing input and output processing functions, and delegates all other data processing functionalities to a backend server (e.g., server system 108).

Figure 2:
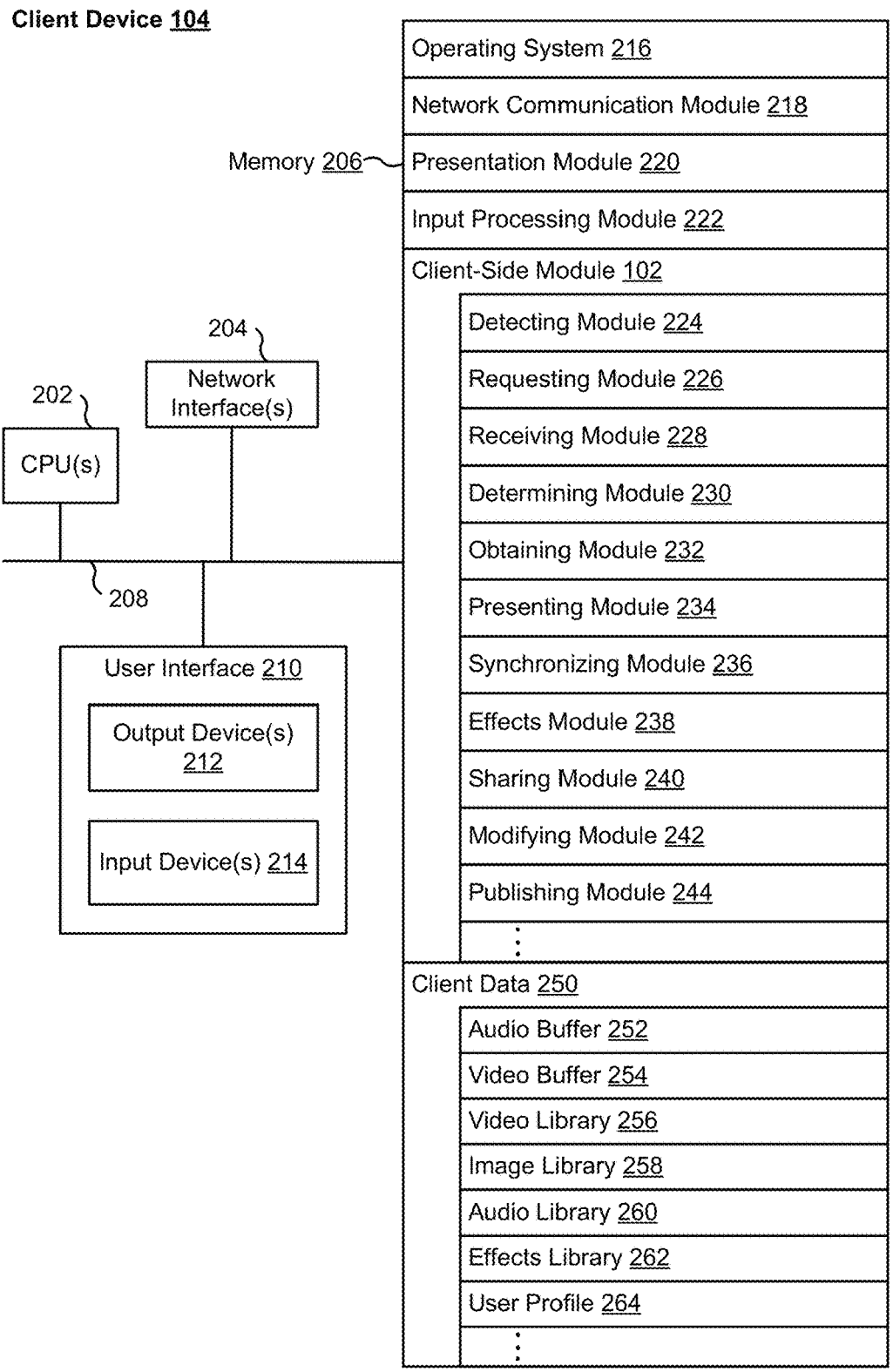
FIG. 2 is a block diagram of a client device in accordance with some embodiments.

FIG. 2 is a block diagram illustrating a representative client device 104 associated with a user in accordance with some embodiments. Client device 104, typically, includes one or more processing units (CPUs) 202, one or more network interfaces 204, memory 206, and one or more communication buses 208 for interconnecting these components (sometimes called a chipset). Client device 104 also includes a user interface 210. User interface 210 includes one or more output devices 212 that enable presentation of media content, including one or more speakers and/or one or more visual displays. User interface 210 also includes one or more input devices including user interface components that facilitate user input such as a keyboard, a mouse, a voice-command input unit or microphone, an accelerometer, a gyroscope, a touch-screen display, a touch-sensitive input pad, a gesture capturing camera, or other input buttons or controls. Furthermore, some client devices 104 use a microphone and voice recognition, a camera and gesture recognition, a brainwave sensor/display, or biologically implanted sensors/displays (e.g. digital contact lenses, fingertip/muscle implants, and so on) to supplement or replace the keyboard, display, or touch screen. Memory 206 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 206, optionally, includes one or more storage devices remotely located from one or more processing units 202. Memory 206, or alternatively the non-volatile memory device(s) within memory 206, includes a non-transitory computer readable storage medium. In some implementations, memory 206, or the non-transitory computer readable storage medium of memory 206, stores the following programs, modules, and data structures, or a subset or superset thereof:

operating system 216 including procedures for handling various basic system services and for performing hardware dependent tasks;

network communication module 218 for connecting user device 104 to other computing devices (e.g., server system 108, audio sources 124a . . . 124n, and media file sources 126*a* . . . 126*n*) connected to one or more networks 110 via one or more network interfaces 204 (wired or wireless);

presentation module 220 for enabling presentation of information (e.g., a media item, a user interface for an application or a webpage, audio and/or video content, text, etc.) at client device 104 via one or more output devices 212 (e.g., displays, speakers, etc.) associated with user interface 210; and input processing module 222 for detecting one or more user inputs or interactions from one of the one or more input devices 214 and interpreting the detected input or interaction.

In some embodiments, memory 206 also includes a client-side module 102 associated with an application for creating, exploring, and playing back media items that includes, but is not limited to:

detecting module 224 for detecting one or more user inputs corresponding to the application;

requesting module 226 for querying a server (e.g., server system 108) for a media item;

receiving module 228 for receiving, from server system 108, one or more media files (e.g., one or more video clips and/or one or more images), information identifying at least a portion of an audio track associated with the requested media item, and information identifying one or more audio and/or video effects (i.e., static and/or interactive effects);

determining module 230 for determining a source for the audio track associated with the media item (e.g., one or more audio sources 124 and/or audio library 260);

obtaining module 232 for obtaining at least the portion of the audio track associated with the media item;

presenting module 234 for presenting the requested media item via one or more output devices 212 by displaying the one or more media files associated with the media item on the display and playing back at least the portion of the audio track via the one or more speakers associated with the media item;

synchronizing module 236 for synchronizing at least the portion of the audio track with the one or more media files;

effects module 238 for applying audio and/or video effects (i.e., static and/or interactive effects) while displaying the one or more media files and/or playing back at least the portion of the audio track;

sharing module 240 for sharing the media item via one or more sharing methods (e.g., email, SMS, social media outlets, etc.);

modifying module 242 for modifying a pre-existing media item so as to generate a new media item based on the pre-existing media item; and publishing module 244 for publishing the new media item.

In some embodiments, memory 206 also includes client data 250 for storing data for the application. Client data 250 includes, but is not limited to:

audio buffer 252 for buffering at least the portion of the obtained audio track for playback;

video buffer 254 for buffering the one or more media files received from server system 108 for display;

video library 256 storing one or more pre-existing video clips recorded prior to executing the application;

image library 258 storing one or more pre-existing images captured prior to executing the application;

audio library 260 storing one or more pre-existing audio tracks created or stored prior to executing the application;

effects library 262 including functions for implementing one or more real-time or post-processed audio and/or video effects (e.g., OpenGL Shading Language (GLSL) shaders); and user profile 264 including a plurality of preferences associated with the application for the user of client device 104.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
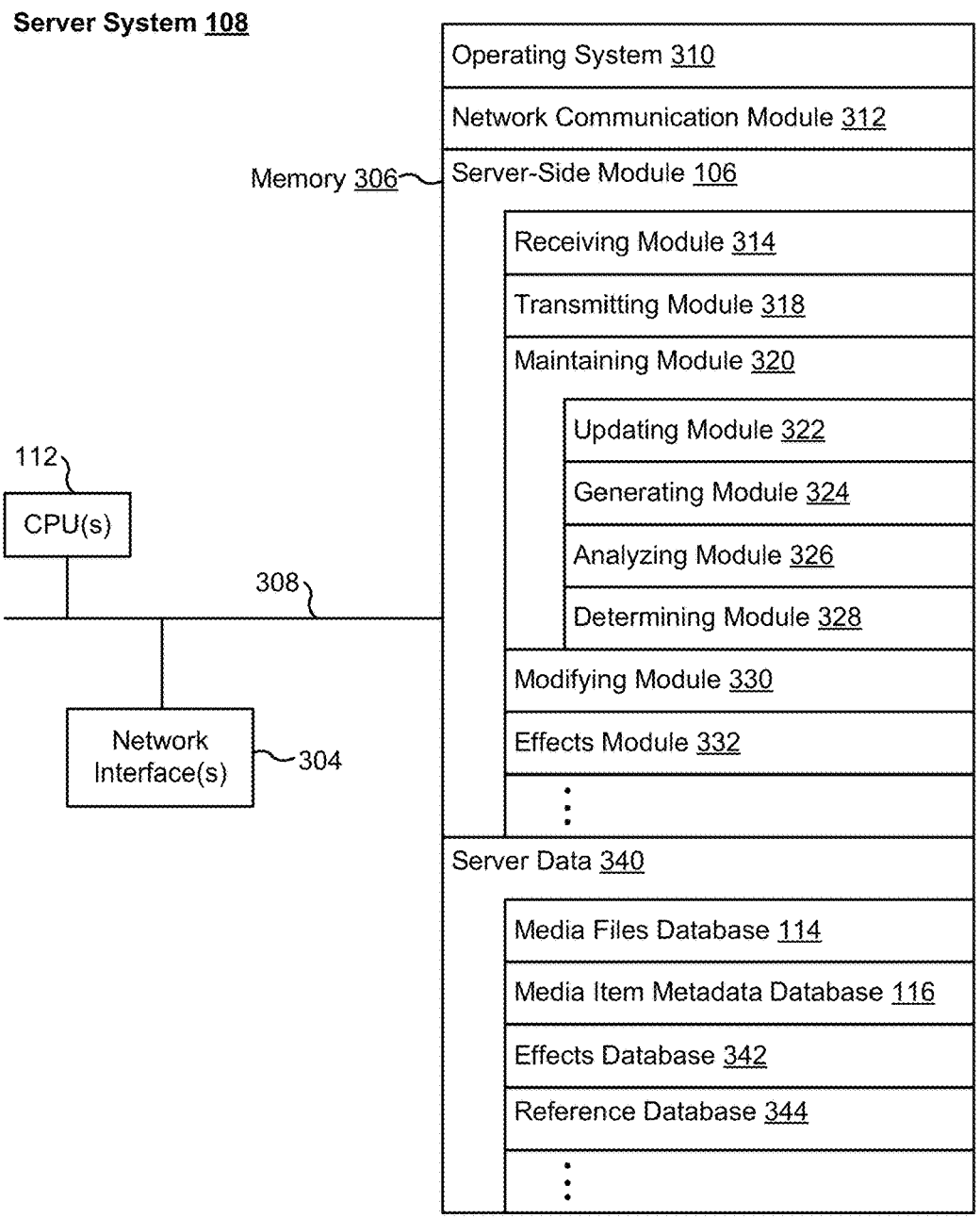
FIG. 3 is a block diagram of a server system in accordance with some embodiments.

FIG. 3 is a block diagram illustrating server system 108 in accordance with some embodiments. Server system 108, typically, includes one or more processing units (CPUs) 112, one or more network interfaces 304 (e.g., including I/O interface to one or more clients 118 and I/O interface to one or more external services 120), memory 306, and one or more communication buses 308 for interconnecting these components (sometimes called a chipset). Memory 306 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 306, optionally, includes one or more storage devices remotely located from one or more processing units 112. Memory 306, or alternatively the non-volatile memory device(s) within memory 306, includes a non-transitory computer readable storage medium. In some implementations, memory 306, or the non-transitory computer readable storage medium of memory 306, stores the following programs, modules, and data structures, or a subset or superset thereof:

operating system 310 including procedures for handling various basic system services and for performing hardware dependent tasks;

network communication module 312 that is used for connecting server system 108 to other computing devices (e.g., client devices 104, audio sources 124*a* . . . 124*n*, and media file sources 126*a* . . . 126*n*) connected to one or more networks 110 via one or more network interfaces 304 (wired or wireless);

a server-side module 106 associated with the application for generating, exploring, and presenting media items that includes, but is not limited to:

receiving module 314 for receiving a request, from client device 104, to playback a media item or for receiving at least a portion of the modified metadata structure;

transmitting module 318 for transmitting, to client device 104, one or more media files (e.g., one or more video clips and/or a sequence of one or more images) associated with the requested media item, information identifying at least a portion of an audio track associated with the requested media item, and information identifying one or more audio and/or video effects associated with the requested media item; and maintaining module 320 for maintaining media item metadata database 116, including, but not limited to:
  updating module 322 for updating one or more fields, tables, and/or entries in a metadata structure associated with a respective media item (e.g., play count, likes, shares, comments, associated media items, and so on);
  generating module 324 for generating a metadata structure for a new media item;
  analyzing module 326 for analyzing the audio track and the one or more media files associated with the new media item; and
  determining module 328 determining whether the analyzed audio track and one or more media files match one of the reference audio tracks and/or video clips in reference database 344;
modifying module 330 for flattening the new media item into a single stream or digital media item or for re-encoding media items for different formats and bit rates;
effects module 332 for receiving and transmitting video and/or audio effects (i.e., static and/or interactive effects) as scripts or computer-readable instructions (e.g., GLSL shaders for use with OpenGL ES) augmented with effect metadata corresponding to effect type, effect version, content, effect parameters, and so on;
server data 340, including but not limited to:
  media files database 114 storing one or more media files (e.g., images and/or video clips);
  media item metadata database 116 storing a metadata structure for each media item, where each metadata structure associates one or more media files and at least a portion of an audio track with a media item;
  effects database 342 storing one or more real-time or post-processed audio and/or video effects as scripts or computer-readable instructions (e.g., GLSL shaders for use with OpenGL ES) augmented with effect metadata corresponding to effect type, effect version, content, effect parameters, a table mapping of interactive input modalities to effect parameters for real-time effect interactivity, and so on; and
  reference database 344 storing a plurality of reference audio tracks and video clips and associated preferences.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

Figure 4A:
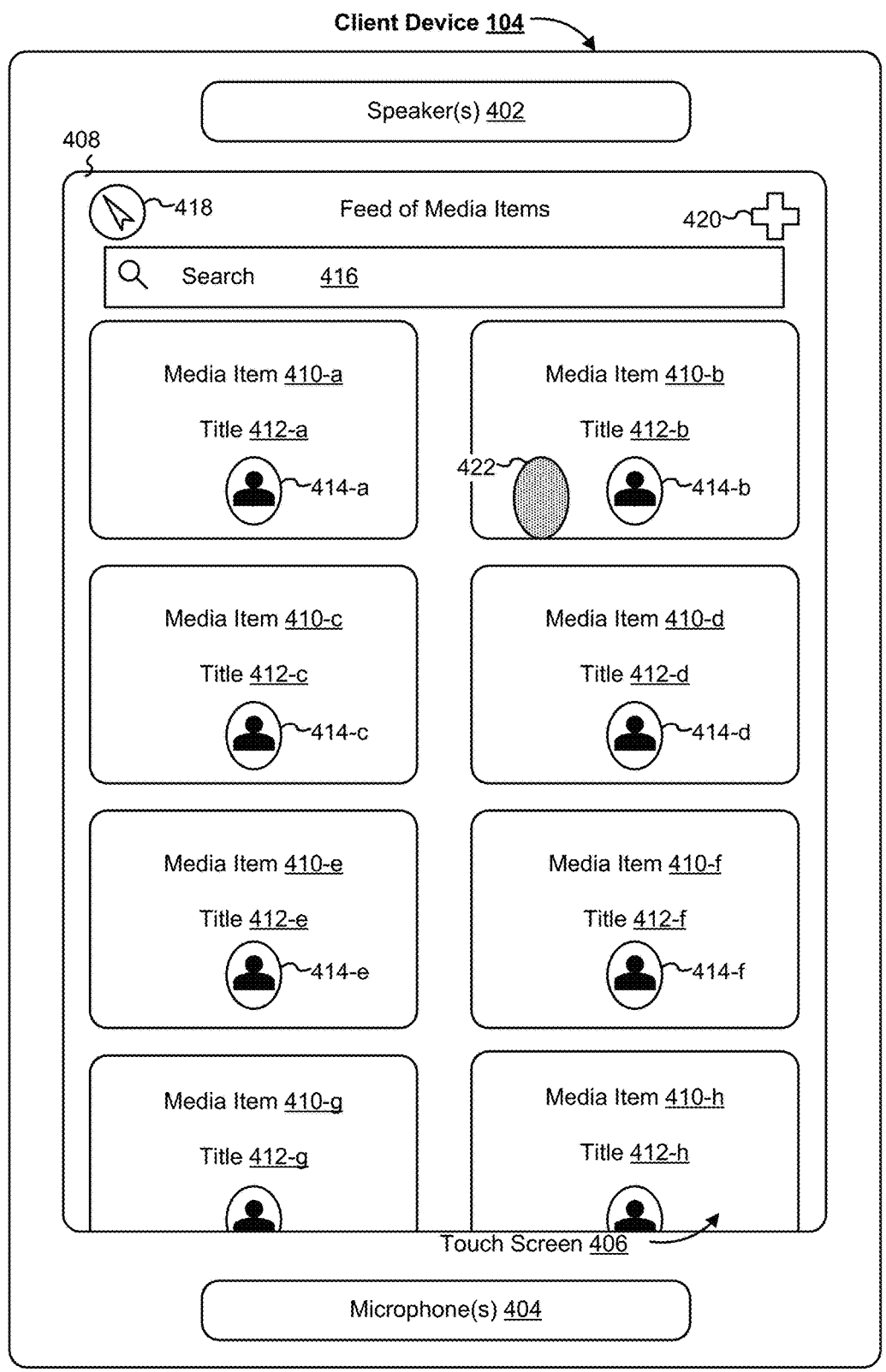
FIGS. 4A-4N illustrate example user interfaces for presenting interactive media items in accordance with some embodiments.

Attention is now directed towards embodiments of user interfaces and associated processes that may be implemented on a respective client device 104 with one or more speakers 402 enabled to output sound, zero or more microphones 404 enabled to receive sound input, and a touch screen 406 (sometimes also herein called a touch screen display) enabled to receive one or more contacts and display information (e.g., media content, webpages and/or user interfaces for an application). FIGS. 4A-4N illustrate example user interfaces for presenting interactive media items in accordance with some embodiments.

Although some of the examples that follow will be given with reference to inputs on touch screen 406 (where the touch sensitive surface and the display are combined), in some embodiments, the device detects inputs on a touch-sensitive surface that is separate from the display. In some embodiments, the touch sensitive surface has a primary axis that corresponds to a primary axis on the display. In accordance with these embodiments, the device detects contacts with the touch-sensitive surface at locations that correspond to respective locations on the display. In this way, user inputs detected by the device on the touch-sensitive surface are used by the device to manipulate the user interface on the display of the device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

FIGS. 4A-4N show user interface 408 displayed on client device 104 (e.g., a mobile phone) for an application for generating, exploring, and presenting media items; however, one skilled in the art will appreciate that the user interfaces shown in FIGS. 4A-4N may be implemented on other similar computing devices. The user interfaces in FIGS. 4A-4N are used to illustrate the processes described herein, including the processes described with respect to FIGS. 6A-6D.

FIG. 4A illustrates client device 104 displaying a user interface for a feed view of the application that includes a feed of media items on touch screen 406. In FIG. 4A, the user interface includes a plurality of media item affordances 410 corresponding to media items generated by users in a community of users and search query box 416 configured to enable the user of client device 104 to search for media items. In some embodiments, media affordances 410 corresponding to sponsored media items are displayed at the top or near the top of the feed of media items. In some embodiments, advertisements are concurrently displayed with the feed of media items such as banner advertisements or advertisements in a side region of the user interface. In some embodiments, one or more of media item affordances 410 correspond to media items that are advertisements. In FIG. 4A, each of media item affordances 410 includes a title 412 of the corresponding media item and a representation 414 of the user in the community of users who authored the corresponding media item. For example, each of representations 414 includes an image associated with the author of the media item (e.g., a headshot or avatar) or an identifier, name, or handle associated with the author of the media item. In some embodiments, a respective representation 414, when activated (e.g., by a touch input from the user), causes client device 104 to display a profile associated with the author of the corresponding media item.

In FIG. 4A, the user interface also includes navigation affordance 418, which, when activated (e.g., by a touch input from the user), causes client device 104 to display a navigation panel for navigating between user interfaces of the application (e.g., one or more of a feed view, user profile, user media items, friends view, exploration view, settings, and so on) and creation affordance 420, which, when activated (e.g., by a touch input from the user), causes client device 104 to display a first user interface of a process for generating a media item. For further description of the process for generating a media item see U.S. Provisional Patent Application No. 61/934,665, entitled "Methods and Devices for Touch-Based Media Creation," filed Jan. 31, 2014, which is hereby incorporated by reference in its entirety. In FIG. 4A, the user interface includes a portion of media item affordances 410-g and 410-h indicating that the balance of the media items can be viewed by scrolling downwards in the feed view. FIG. 4A also illustrates client device 104 detecting contact 422 at a location corresponding to media item affordance 410-b.

For example, in response to detecting contact 422 selecting media item affordance 410-b in FIG. 4A, client device 104 sends a notification to server system 108 to update a play count field in the metadata structure associated with the respective media item (e.g., play count field 526 in FIG. 5). In this example, in response to receiving the notification, server system 108 or a component thereof (e.g., updating module 322, FIG. 3) updates play count field 526, as shown in FIG. 5, in a metadata structure associated with the respective media item corresponding to media item affordance 410-b to reflect the notification.

Figure 4B:
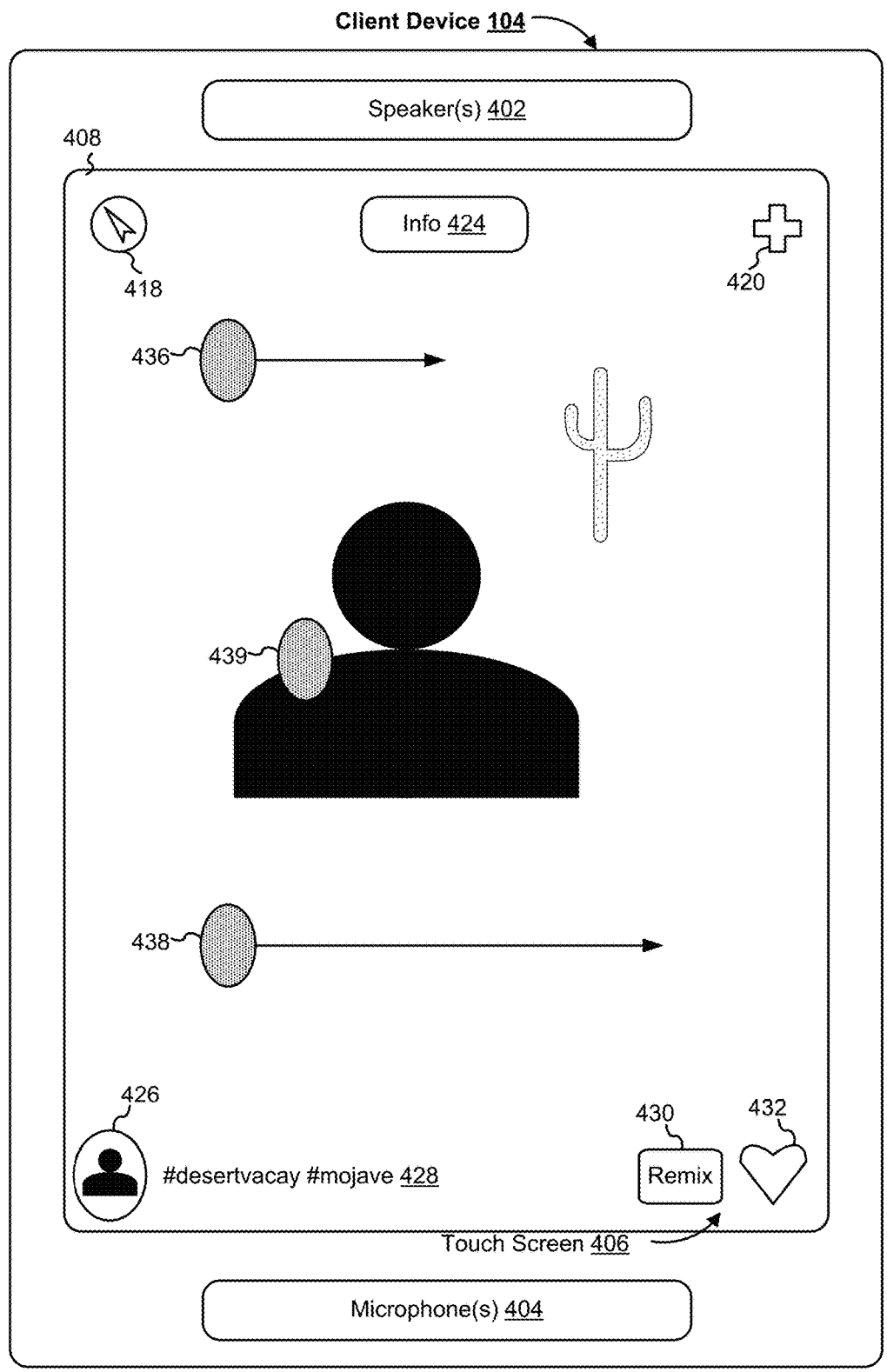

FIG. 4B illustrates client device 104 presenting a respective media item on touch screen 406 that corresponds to media item affordance 410-b in response to detecting contact 422 selecting media item affordance 410-b in FIG. 4A. In FIG. 4B, the user interface includes information affordance 424, which, when activated (e.g., by a touch input from the user), causes client device 104 to display an informational user interface with information and one or more options associated with the respective media item and representation 426, which, when activated (e.g., by a touch input from the user), causes client device 104 to display a profile associated with the author of the respective media item. For example, representation 426 is an image associated with the author of the respective media item (e.g., a headshot or avatar) or an identifier, name, or handle associated with the author of the respective media item. In FIG. 4B, the user interface also includes hashtags 428 associated with the respective media item, remix affordance 430, which, when activated (e.g., by a touch input from the user), causes client device 104 to display options (e.g., remix options 460 in FIG. 4M) for modifying the respective media item, and like affordance 432, which, when activated (e.g., by a touch input from the user), causes client device 104 to send a notification to server system 108 to update a like field in the metadata structure associated with the respective media item (e.g., likes field 530 in FIG. 5). For example, in response to receiving the notification, server system 108 or a component thereof (e.g., updating module 322, FIG. 3) updates likes field 530, as shown in FIG. 5, in a metadata structure associated with the media item to reflect the notification.

FIG. 4B also illustrates client device 104 detecting a left-to-right swipe gesture with contact 436 on touch screen 406. FIG. 4B also illustrates client device 104 detecting a left-to-right swipe gesture with contact 438 on touch screen 406. FIG. 4B further illustrates client device 104 detecting contact 439 on touch screen 406 (e.g., a press and hold gesture).

In some embodiments, advertisements are concurrently displayed with the respective media item such as banner advertisements or advertisements in a side region of the user interface. In some embodiments, owners of copyrighted audio tracks and video clips upload at least a sample of the audio tracks and video clips to reference database 344 (FIG. 3) associated with the provider of the application. For example, prior to or while presenting the respective media item, server system 108 or a component thereof (e.g., analyzing module 326, FIG. 3) analyzes the one or more audio tracks and one or more video clips associated with the respective media item to determine a digital fingerprint for the one or more audio tracks and one or more video clips. In some embodiments, when server system 108 or a component thereof (e.g., determining module 328, FIG. 3) determines that the digital fingerprint for the one or more audio tracks and one or more video clips associated with the respective media item matches copyrighted audio tracks and/or video clips in reference database 344, server system 108 or a component thereof is configured to share advertising revenue with the owners of copyrighted audio tracks and/or video clips.

Figure 4C:
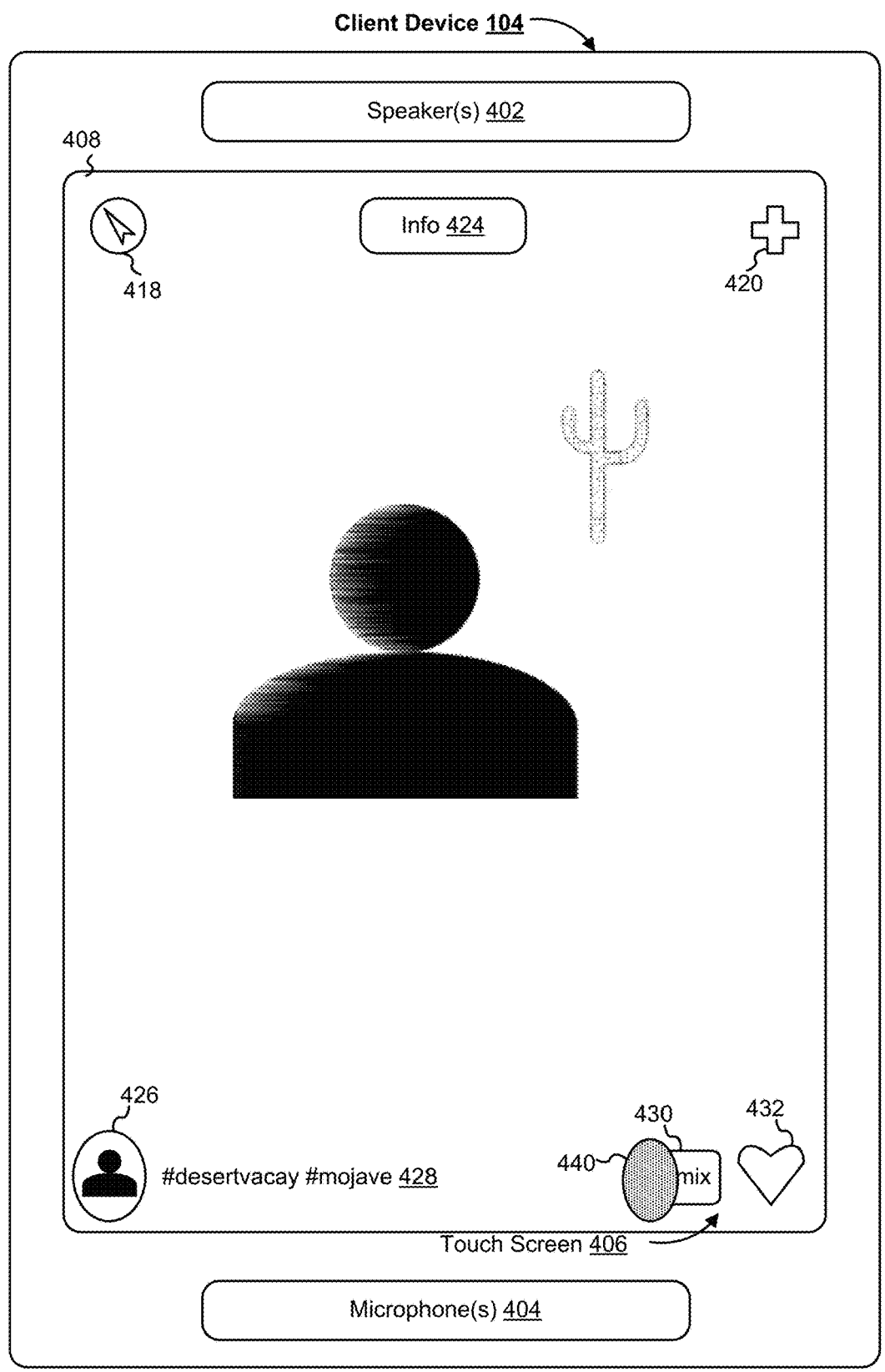

FIG. 4C illustrates client device 104 continuing to present the respective media item, as in FIG. 4B, and applying an interactive wind effect (e.g., specified in the metadata structure associated with the respective media item) to the one or more media files and the audio track associated with the respective media item in response to detecting the left-to-right swipe gesture with contact 436 in FIG. 4B. In some embodiments, one or more characteristics of the swipe gesture, such as the gesture type, number of contacts, direction, acceleration, speed, or distance, determine one or more parameters of the wind effect. In FIG. 4C, the wind effect is applied to the one or more media files associated with the respective media item in a left-to-right direction corresponding to the direction of the swipe gesture in FIG. 4B. In FIG. 4C, the magnitude of the wind effect's impact on the one or more media files is determined by the acceleration or distance of the swipe gesture with contact 436 in FIG. 4B. Furthermore, with reference to FIG. 4C, the wind effect is also applied to the audio track associated with the respective media item in a manner determined by the swipe gesture with contact 436 in FIG. 4B. For example, the magnitude that the wind effect distorts the audio track, or the volume of the wind effect being applied to the audio track, is determined by the acceleration or distance of the swipe gesture with contact 436 in FIG. 4B. FIG. 4C also illustrates client device 104 detecting contact 440 on touch screen 406 at a location corresponding to remix affordance 430.

Figure 4D:
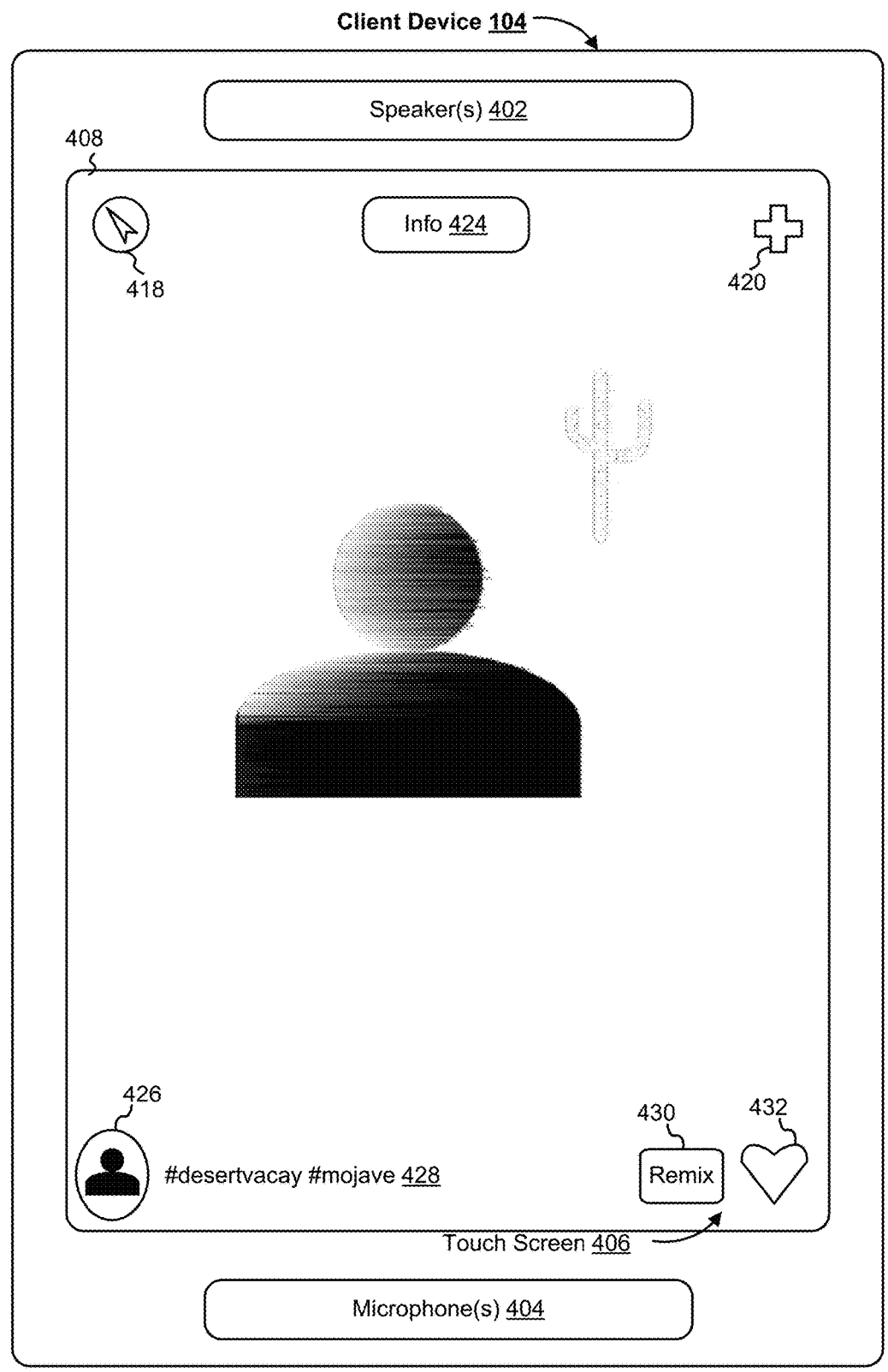

FIG. 4D illustrates client device 104 continuing to present the respective media item, as in FIG. 4B, and applying an interactive wind effect (e.g., specified in the metadata structure associated with the respective media item) to the one or more media files and the audio track associated with the respective media item in response to detecting the left-to-right swipe gesture with contact 438 in FIG. 4B. In FIG. 4D, the wind effect is applied to the one or more media files associated with the respective media item in a left-to-right direction corresponding to the direction of the swipe gesture with contact 438 in FIG. 4B. In FIG. 4D, the magnitude of the wind effect's impact on the one or more media files is determined by the acceleration or distance of the swipe gesture with contact 438 in FIG. 4B. Furthermore, with reference to FIG. 4D, the wind effect is also applied to the audio track associated with the respective media item in a manner determined by the swipe gesture with contact 438 in FIG. 4B. For example, with respect to FIGS. 4C-4D, the magnitude of the wind effect's impact on the one or more media files and the audio track associated with the respective media item is greater in FIG. 4D than in FIG. 4C because the distance of the swipe gesture with contact 438 in FIG. 4B is greater than the distance of the swipe gesture with contact 436 in FIG. 4B.

Figure 4E:
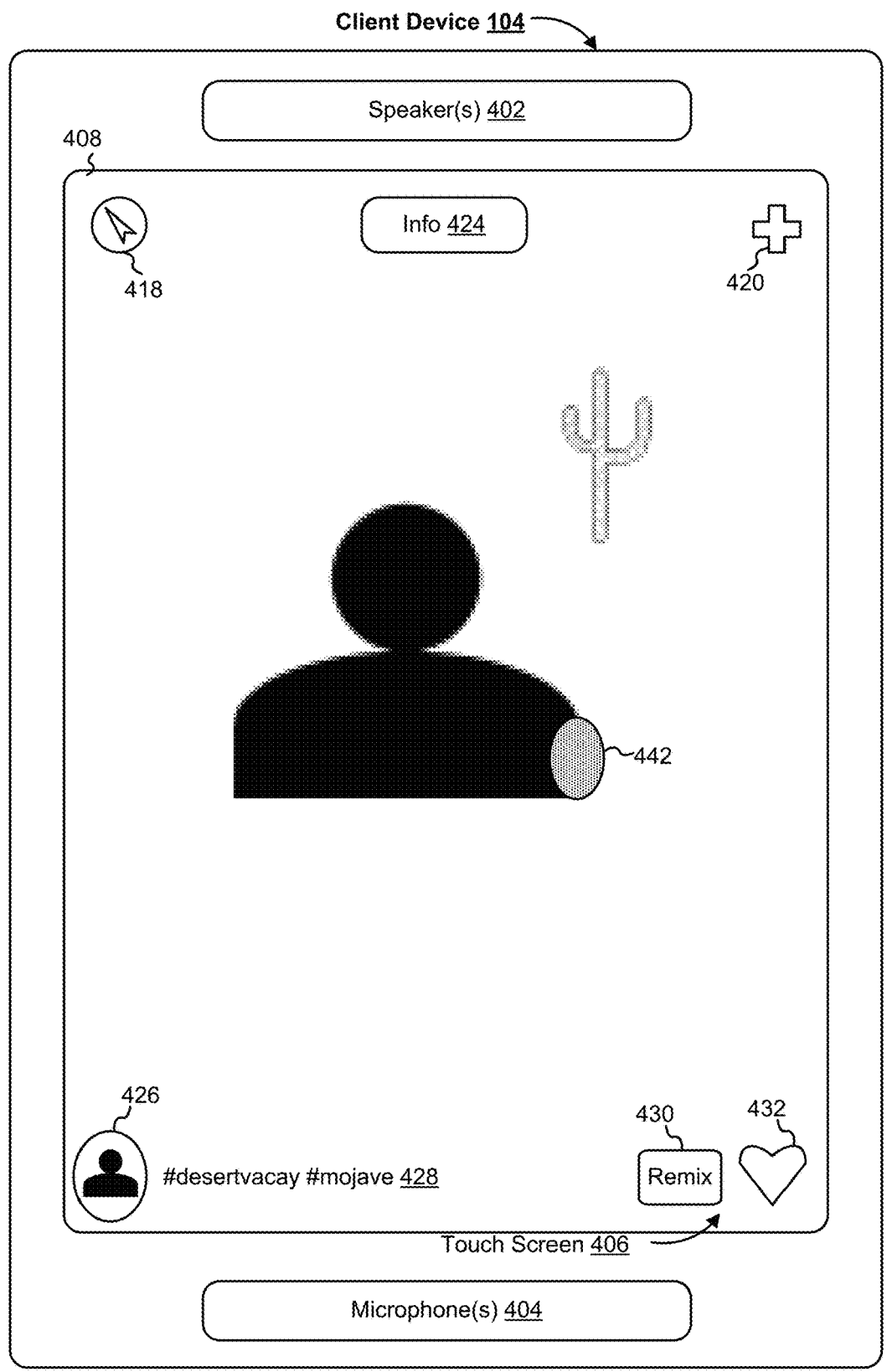

FIG. 4E illustrates client device 104 continuing to present the respective media item, as in FIG. 4B, and applying an interactive pixelization effect (e.g., specified in the metadata structure associated with the respective media item) to the one or more media files associated with the respective media item in response to detecting contact 439 in FIG. 4B. In FIG. 4E, the magnitude of the pixelization effect's impact on the one or more media files is determined by the duration of contact 439 (e.g., a press and hold gesture) in FIG. 4B. For example, the longer the touch gesture is held the greater the one or more media files are pixelized (i.e., the dimensions of each pixel in the one or more media files being presented are increased). FIG. 4E also illustrates client device 104 detecting contact 442 on touch screen 406.

Figure 4F:
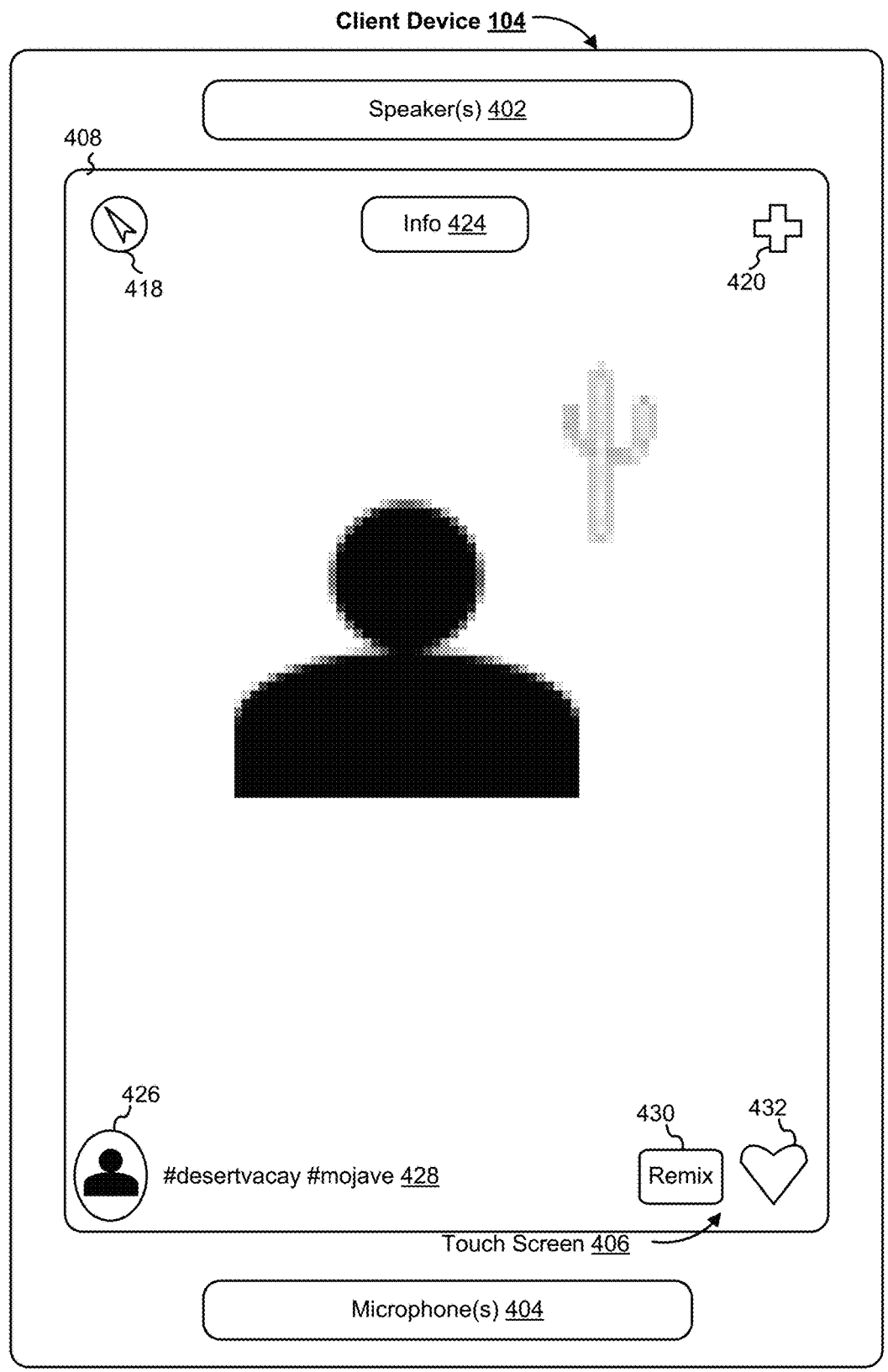

FIG. 4F illustrates client device 104 continuing to present the respective media item, as in FIG. 4E, and further applying the pixelization effect to the one or more media files associated with the respective media item in response to detecting contact 442 in FIG. 4E. In FIG. 4F, the magnitude of the pixelization effect's impact on the one or more media files is increased (i.e., compared to its magnitude in FIG. 4E) in response to the duration of contact 442 (e.g., a press and hold gesture) in FIG. 4E.

Figure 4G:
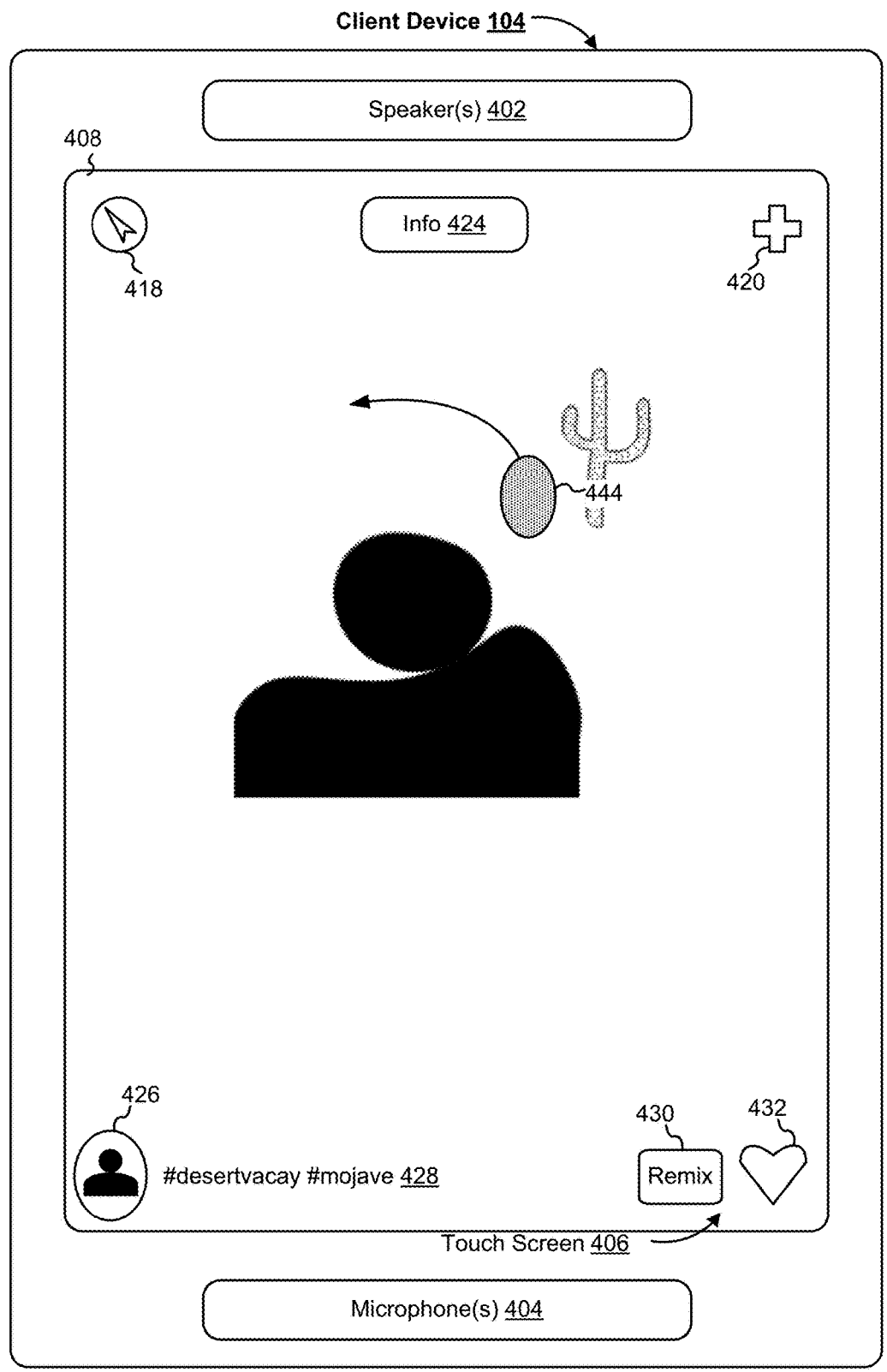

FIG. 4G illustrates client device 104 presenting a respective media item on touch screen 406 that corresponds to media item affordance 410-b in response to detecting contact 422 selecting media item affordance 410-b in FIG. 4A. FIG. 4G also illustrates client device 104 automatically applying an interactive swirl effect (e.g., specified in the metadata structure associated with the respective media item) to the one or more media files associated with the respective media item in response to detecting contact 422 selecting media item affordance 410-b in FIG. 4A. In some embodiments, one or more parameters of the swirl effect, such as direction, radius, speed, and so on, are predetermined (e.g., by the author of the respective media item) in the metadata structure associated with the respective media item. In FIG. 4G, the swirl effect is applied to the one or more media files associated with the respective media item in a counter-clockwise manner (e.g., as specified in the metadata structure associated with the respective media item). FIG. 4G also illustrates client device 104 detecting a counter-clockwise dragging gesture with contact 444 on touch screen 406.

Figure 4H:
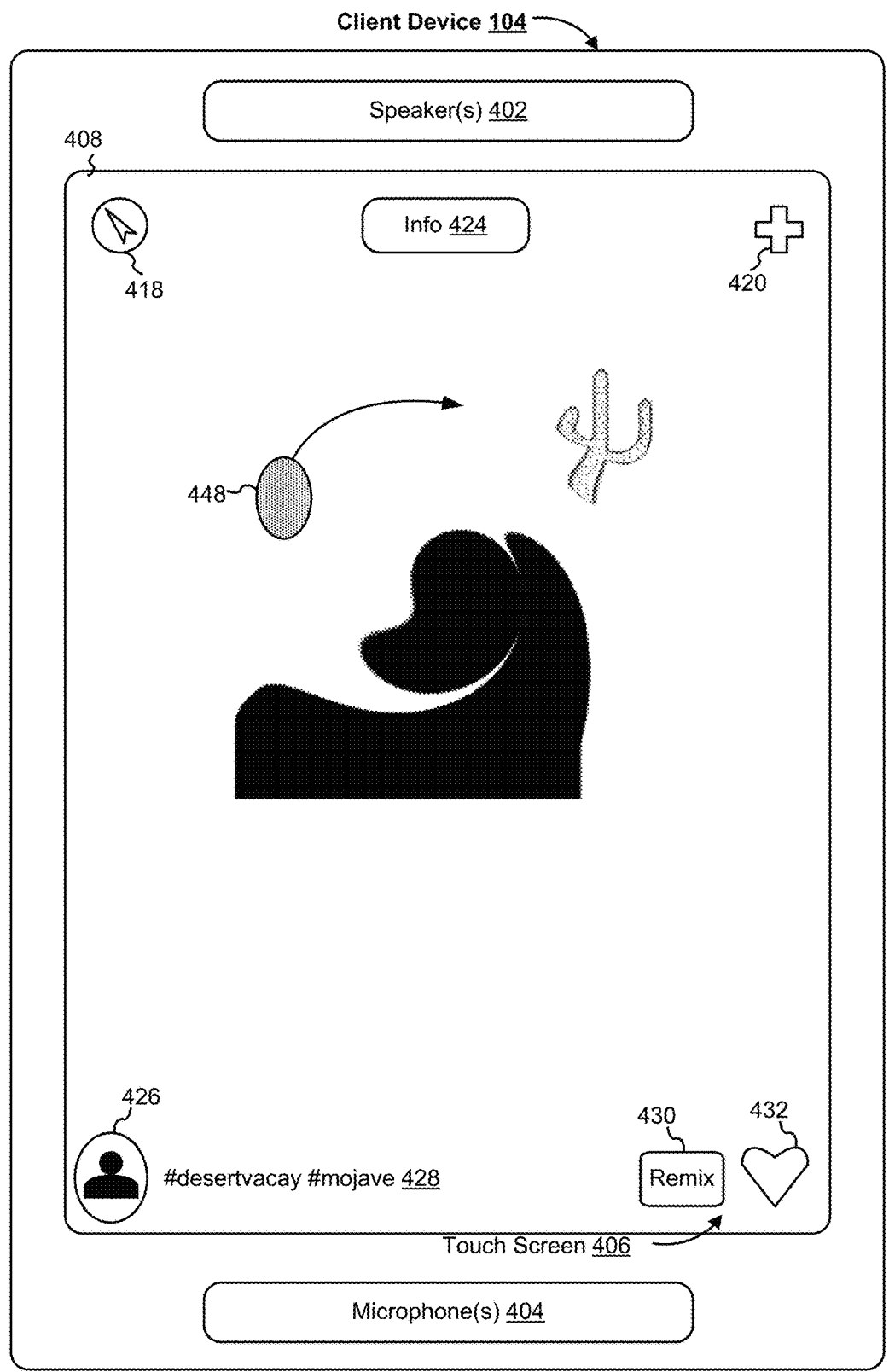

FIG. 4H illustrates client device 104 continuing to present the respective media item, as in FIG. 4G, and further applying the swirl effect to the one or more media files associated with the respective media item in response to detecting the gesture with contact 444 in FIG. 4G. In some embodiments, one or more characteristics of the gesture, such as the gesture type, number of contacts, direction, acceleration, speed, and so on, determine the manner in which the one or more parameters of the swirl effect are modulated. In FIG. 4H, the magnitude of the swirl effect's impact on the one or more media files in the counter-clockwise direction is increased (i.e., compared to its magnitude in FIG. 4G) in response to detecting the dragging gesture FIG. 4G. FIG. 4H also illustrates client device 104 detecting a clockwise dragging gesture with contact 448 on touch screen 406.

Figure 4I:
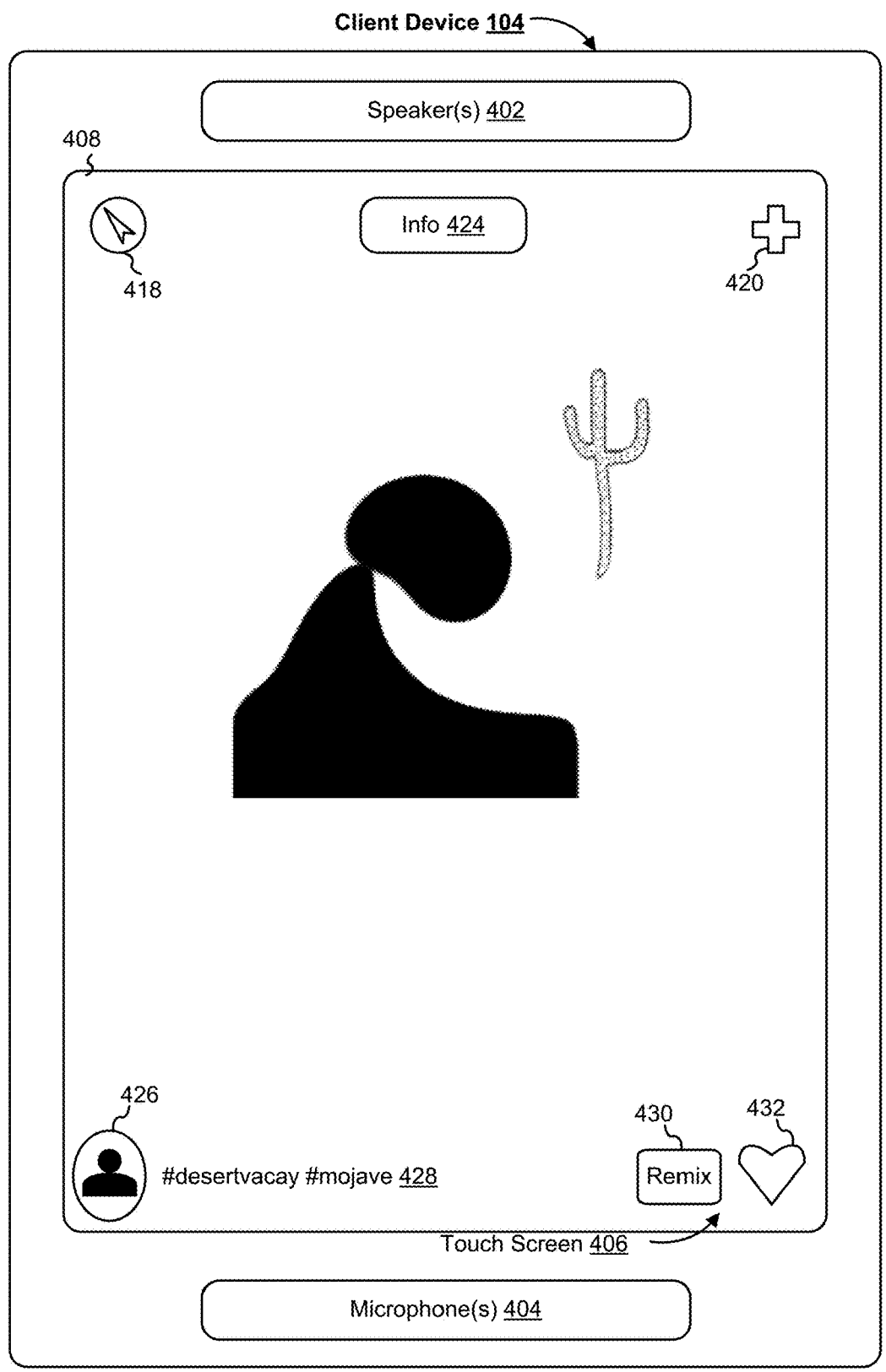

FIG. 4I illustrates client device 104 continuing to present the respective media item, as in FIGS. 4G-4H, and further applying the swirl effect to the one or more media files associated with the respective media item in response to detecting the dragging gesture in FIG. 4H. In FIG. 4I, the swirl effect is applied to the one or more media files in a clockwise direction in response to detecting the clockwise dragging gesture in FIG. 4H.

Figure 4J:
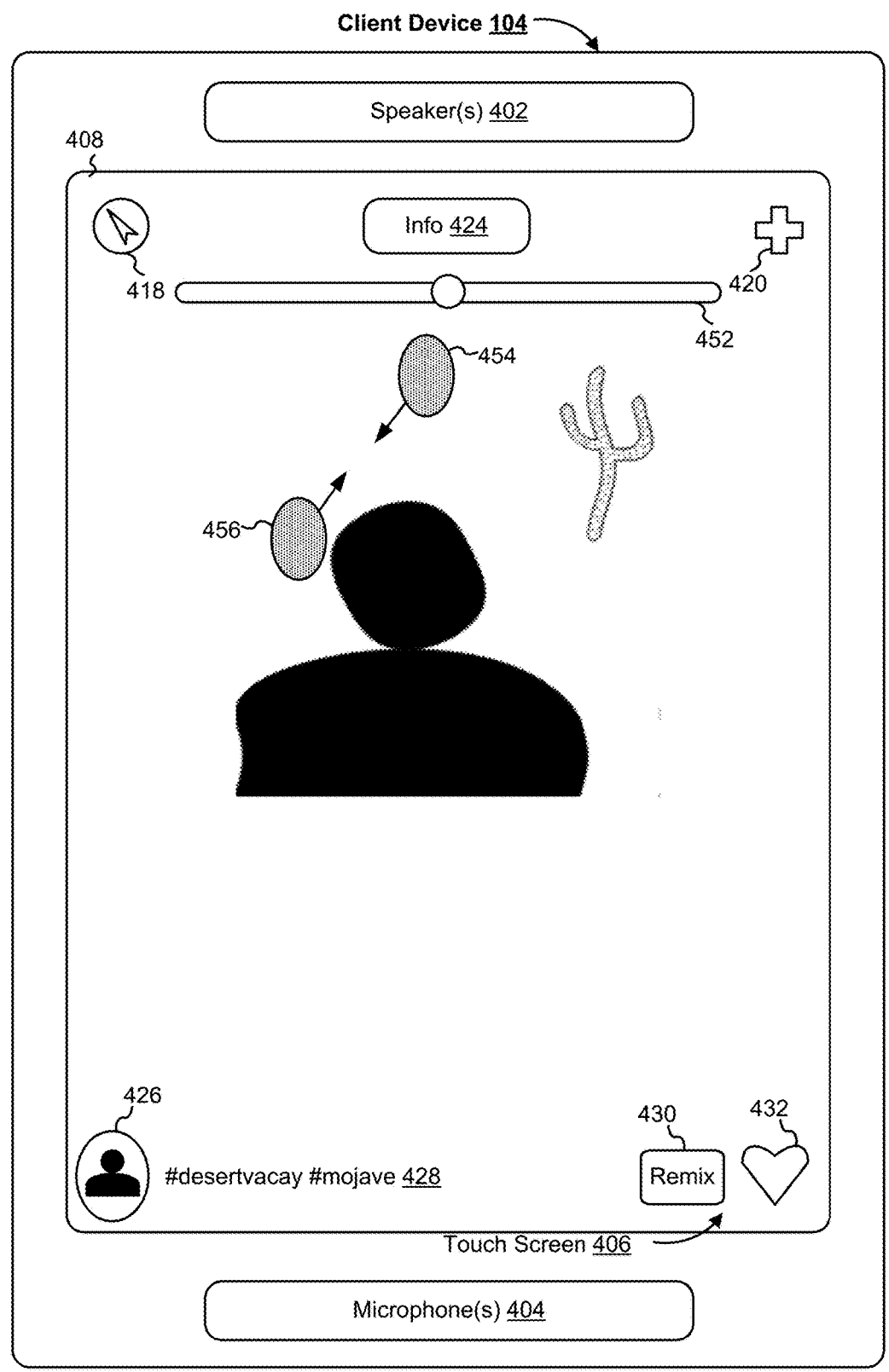

FIG. 4J illustrates client device 104 presenting a respective media item on touch screen 406 that corresponds to media item affordance 410-b in response to detecting contact 422 selecting media item affordance 410-b in FIG. 4A. FIG. 4J also illustrates client device 104 automatically applying an interactive ripple effect (e.g., specified in the metadata structure associated with the respective media item) to the one or more media files associated with the respective media item in response to detecting contact 422 selecting media item affordance 410-b in FIG. 4A. In some embodiments, one or more parameters of the ripple effect, such as wave type, orientation, frequency, amplitude, and so on, are predetermined (e.g., by the author of the respective media item) in the metadata structure associated with the respective media item. In FIG. 4J, the ripple effect is applied to the one or more media files associated with the respective media item using a plurality of sine waves applied in a horizontal direction (e.g., as specified in the metadata structure associated with the respective media item). In FIG. 4J, the user interface includes effect modulator 452 for modulating one or more parameters of the ripple effect in real-time. For example, in FIG. 4J, effect modulator 452 is a slider that increases the amplitude of the sine waves associated with the ripple effect when slid left-to-right and decreases the amplitude of the sine waves associated with the ripple effect when slid right-to-left. In some embodiments, effect modulator 452 controls multiple parameters of an interactive audio and/or video effect to simplify the user experience when modulating the interactive audio and/or video effect. FIG. 4J also illustrates client device 104 detecting a pinch gesture with contacts 454 and 456 on touch screen 406.

Figure 4K:
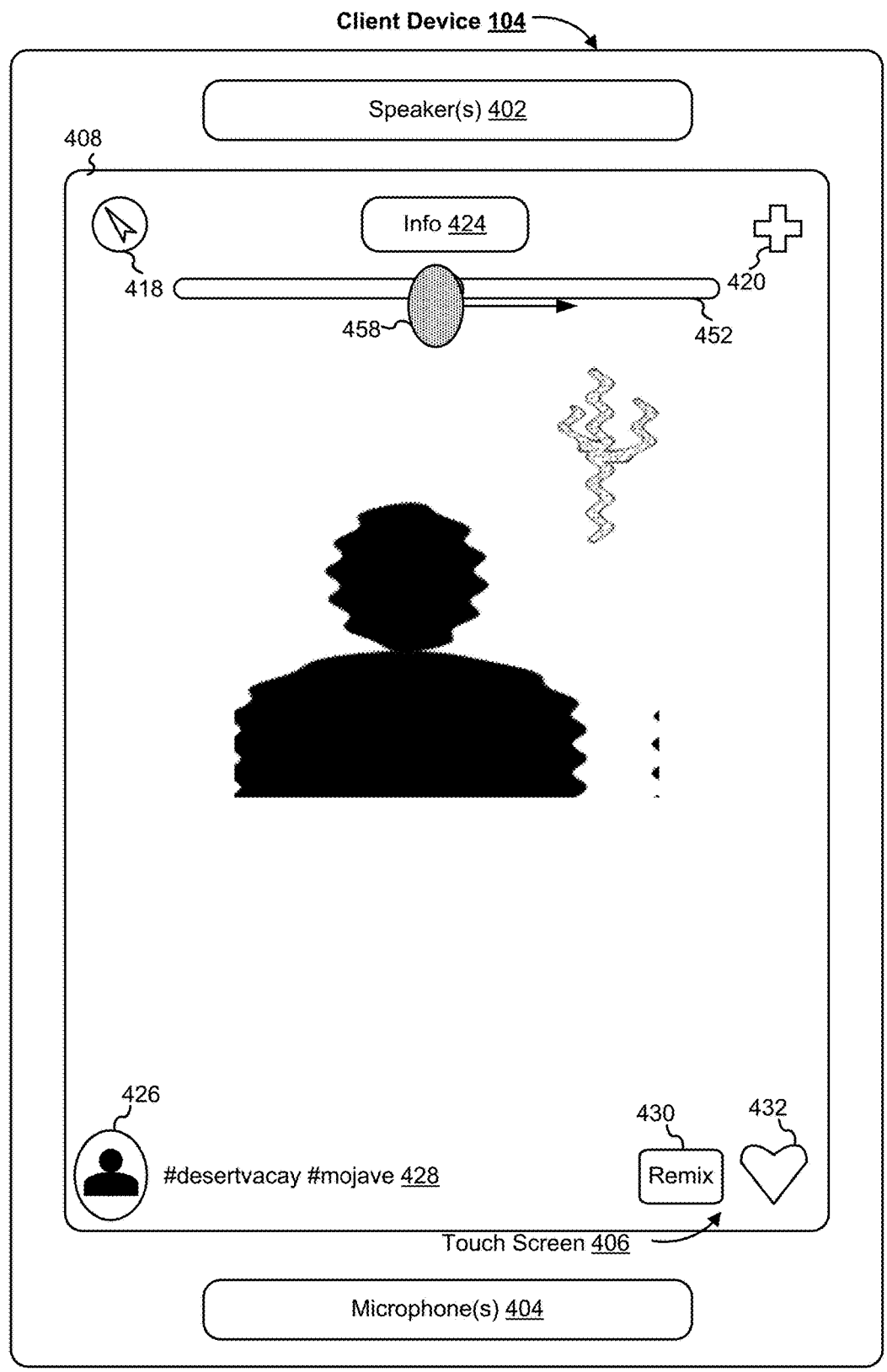

FIG. 4K illustrates client device 104 continuing to present the respective media item, as in FIG. 4J, and further applying the ripple effect to the one or more media files associated with the respective media item in response to detecting the pinch gesture with contacts 454 and 456 in FIG. 4J. In some embodiments, one or more characteristics of the gesture, such as the gesture type, number of contacts, direction, acceleration, speed, and so on, determines the manner in which the one or more parameters of the ripple effect are modulated. In FIG. 4K, the frequency of the sine waves associated with the ripple effect are increased (i.e., compared to the frequency in FIG. 4J) in response to detecting the pinch gesture in FIG. 4J. Conversely, for example, the frequency of the sine waves associated with the ripple effect are decreased in response to a de-pinch gesture that is substantially opposite to the pinch gesture in FIG. 4J. FIG. 4K also illustrates client device 104 detecting a dragging gesture with contact 458 on touch screen 406 at a location corresponding to effect modulator 452.

Figure 4L:
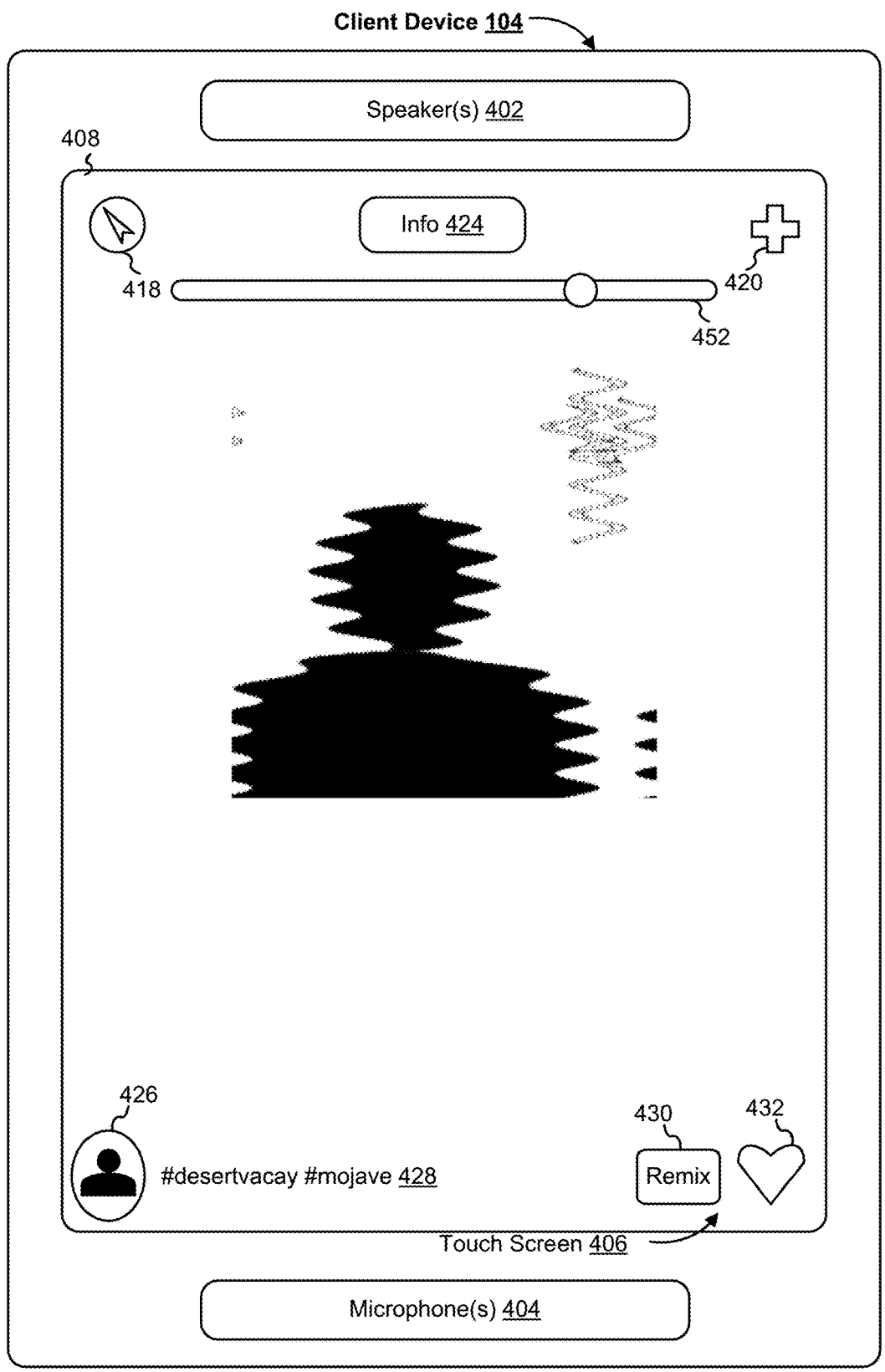

FIG. 4L illustrates client device 104 continuing to present the respective media item, as in FIGS. 4J-4K, and further applying the ripple effect to the one or more media files associated with the respective media item in response to detecting the dragging gesture with contact 458 in FIG. 4K.

In FIG. 4L, the amplitude of the sine waves associated with the ripple effect are increased (i.e., compared to the amplitude in FIGS. 4J-4K) in response to detecting the dragging gesture in FIG. 4K.

Figure 4M:
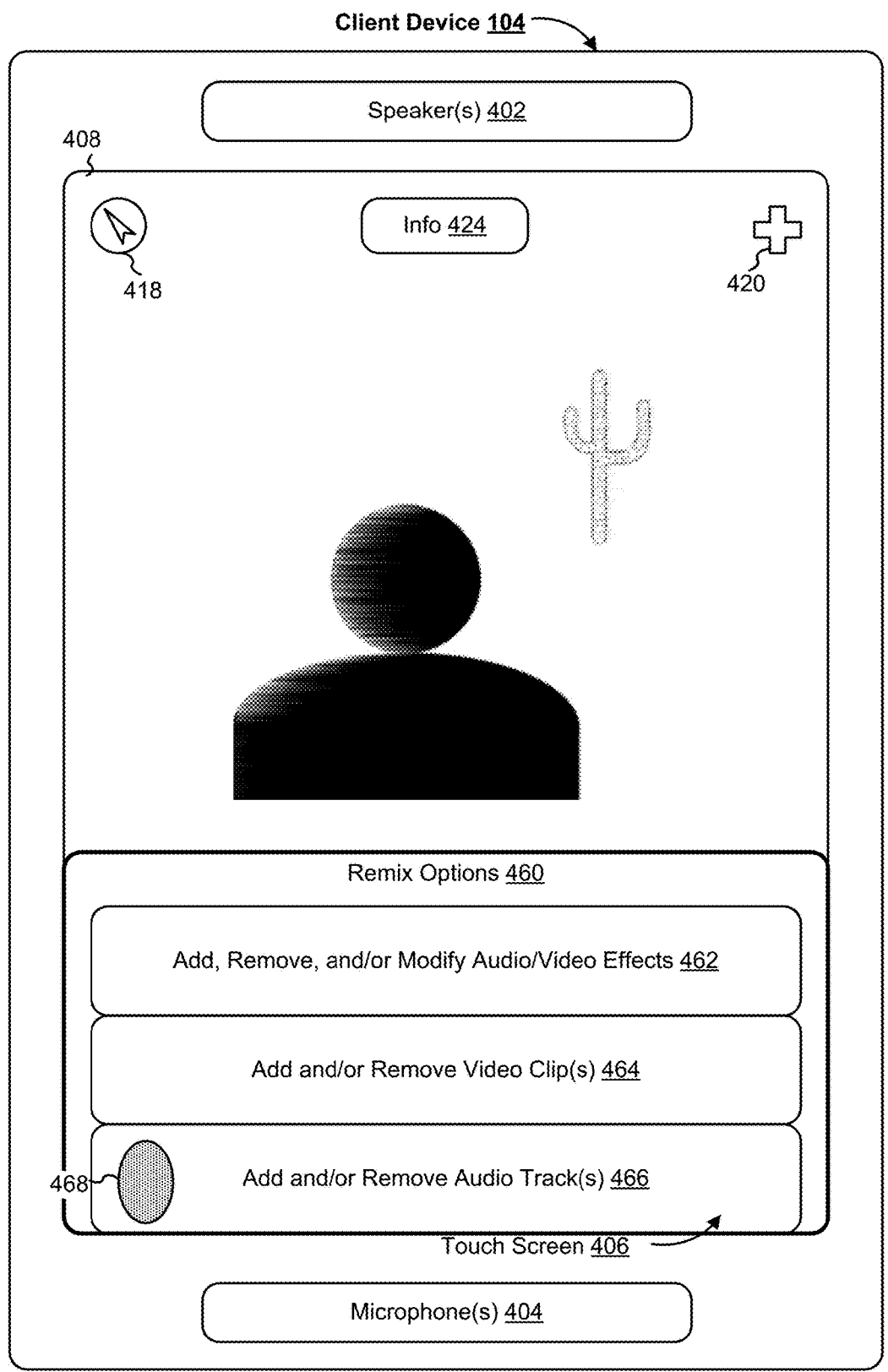
Figure 4N:
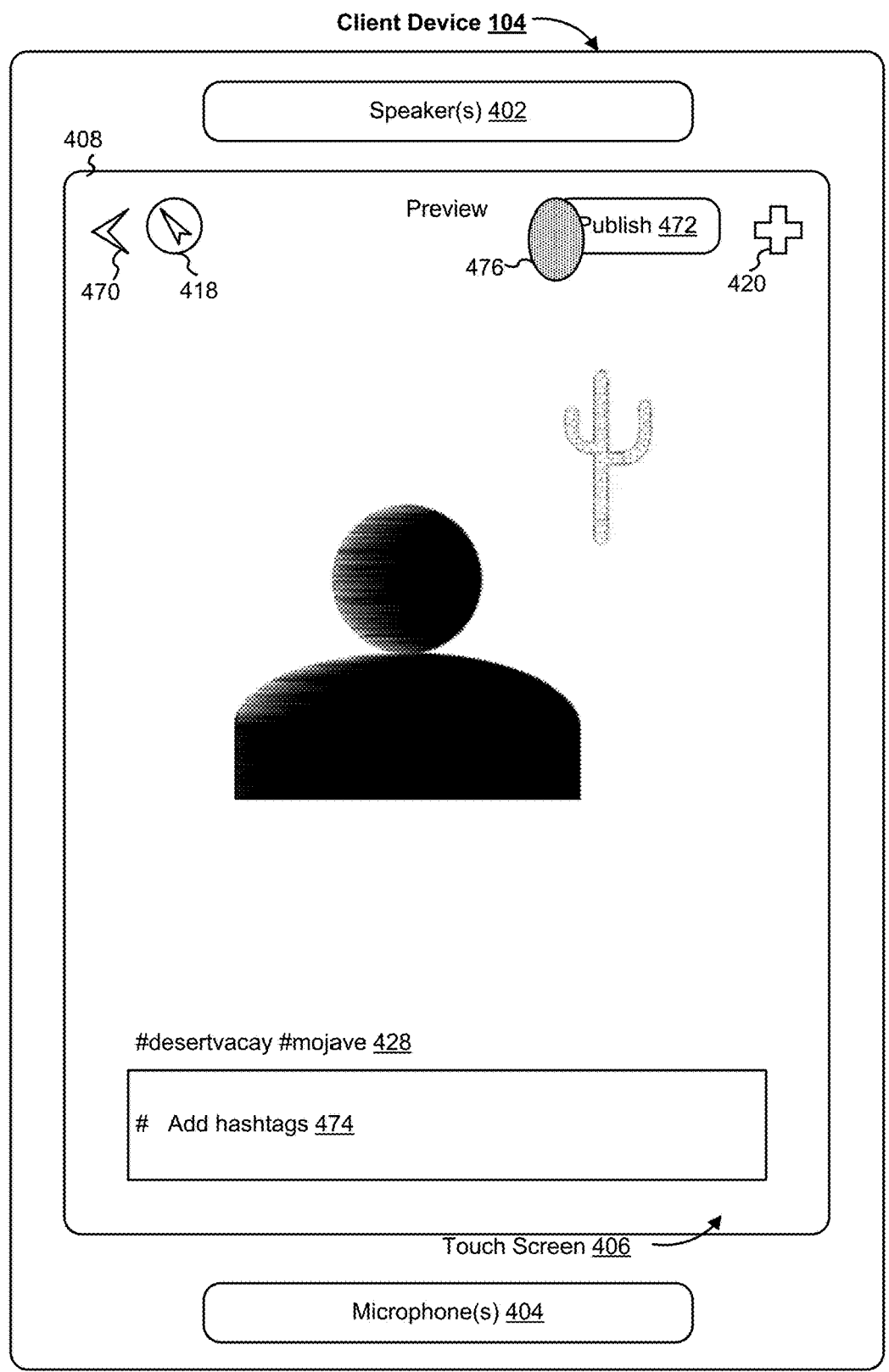
Figure 6A:
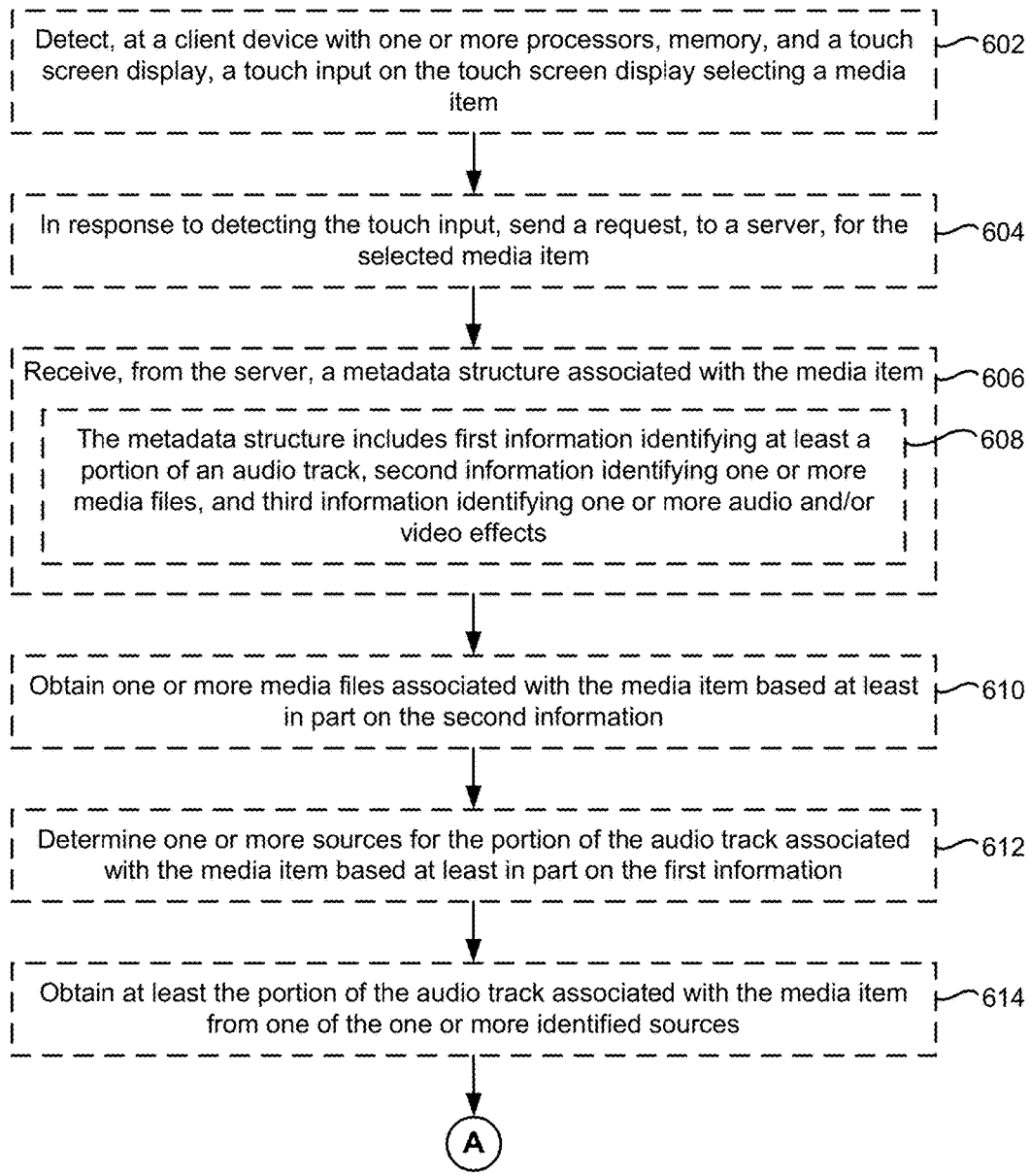
FIGS. 6A-6D illustrate a flowchart representation of a method of presenting interactive media items in accordance with some embodiments.
Figure 6B:
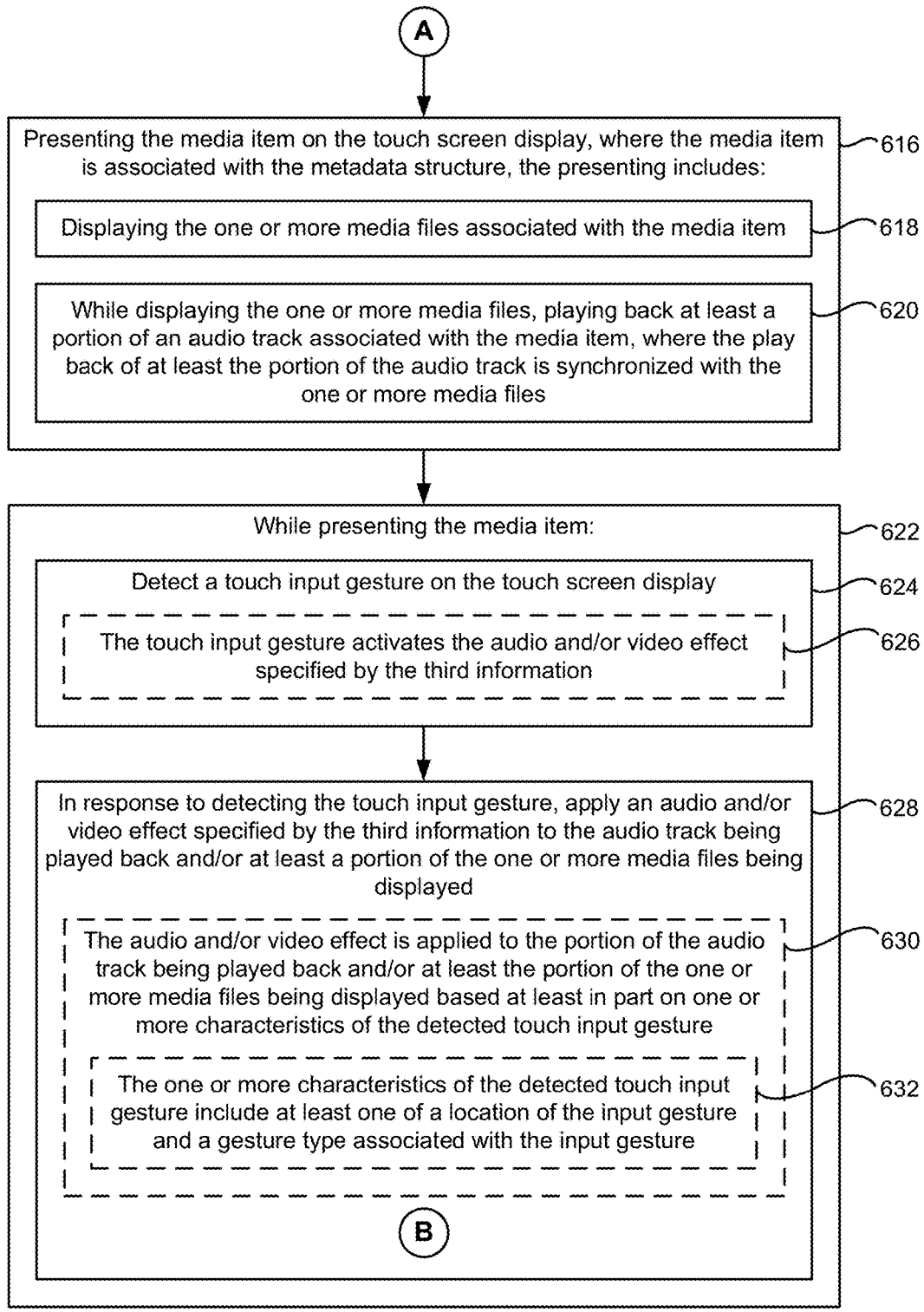
Figure 6C:
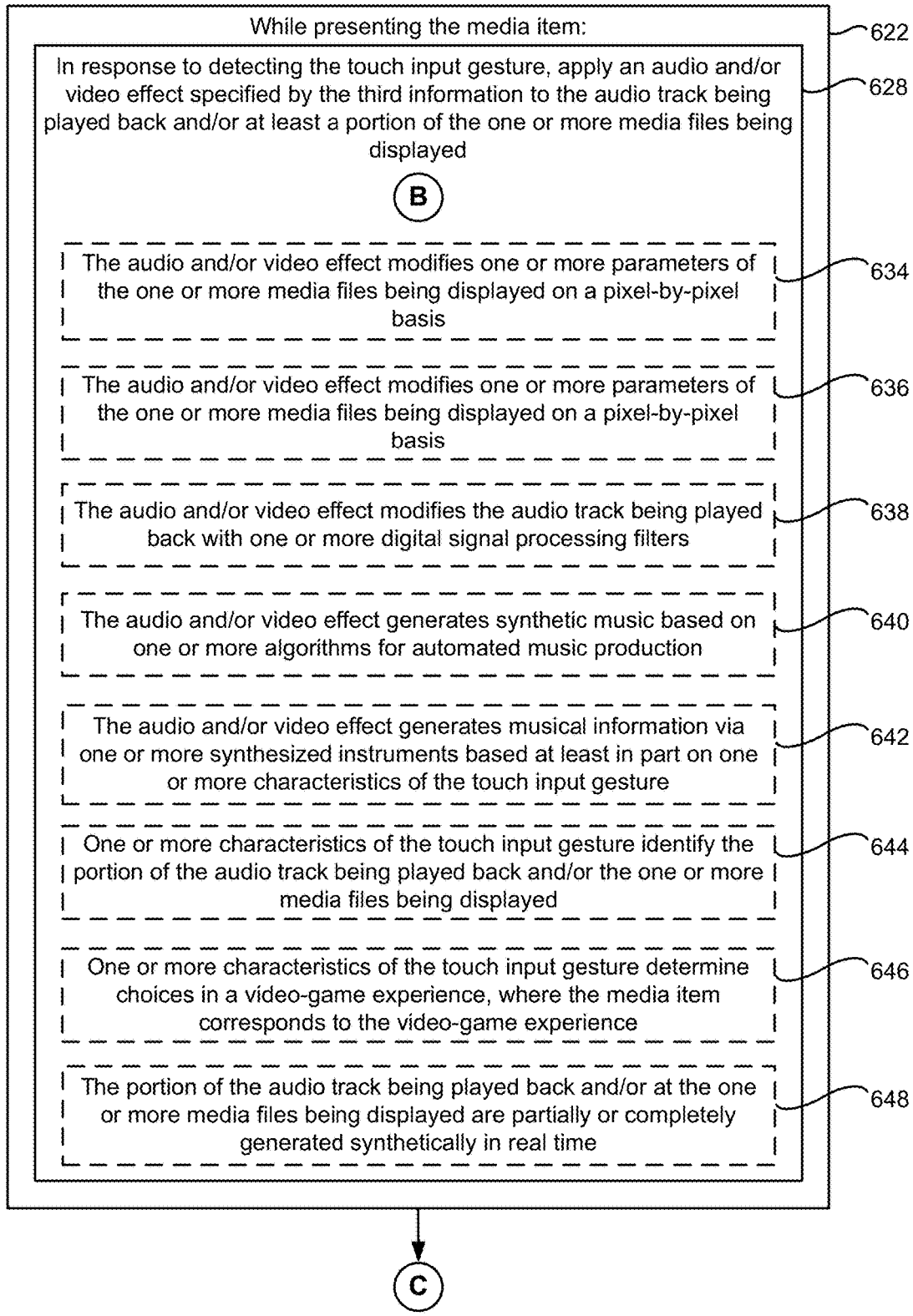
Figure 6D:
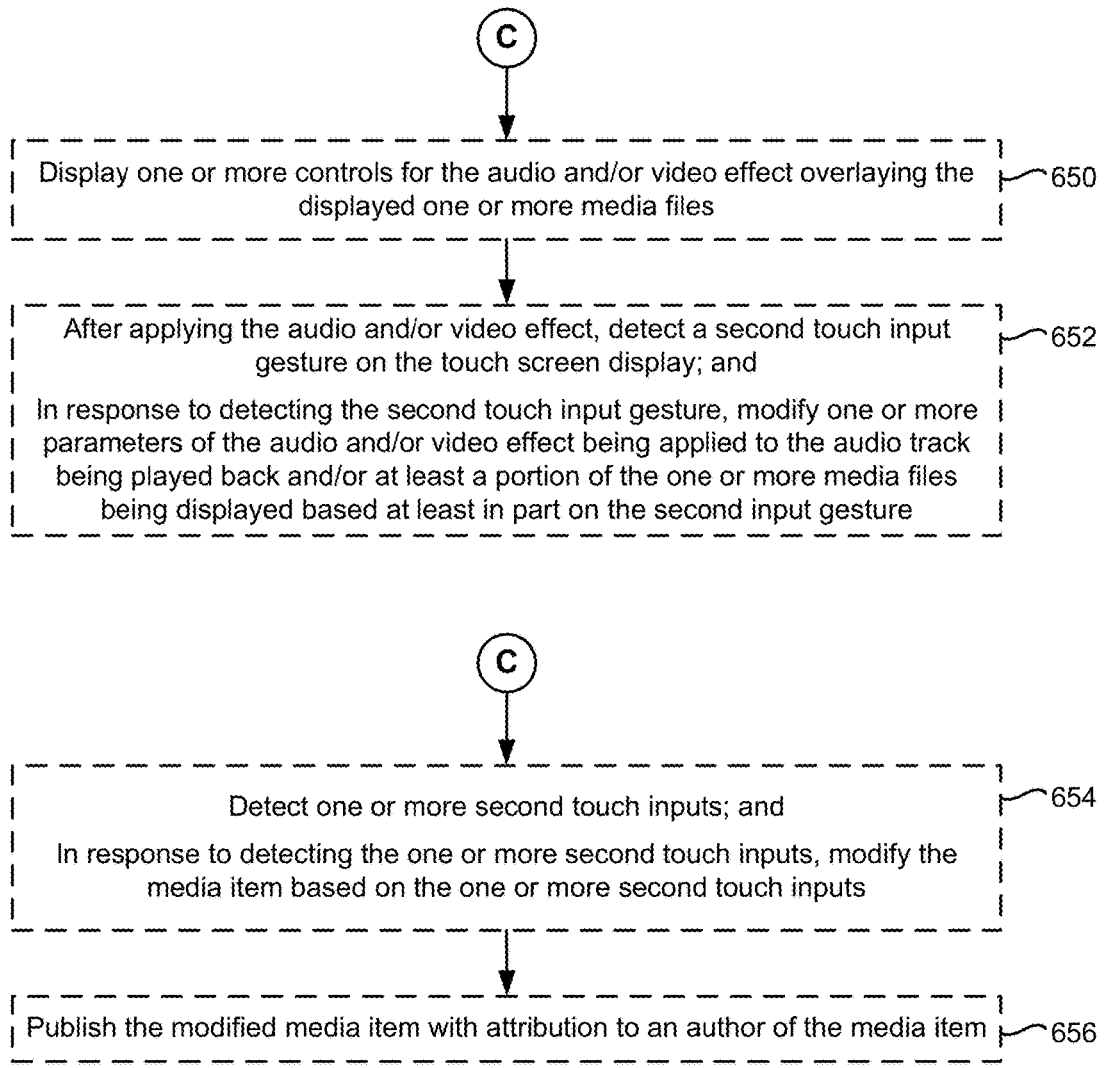

FIG. 4M illustrates client device 104 continuing to present the respective media item, as in FIG. 4C, and, also, displaying remix options 460 over the respective media item being presented on touch screen 406 in response to detecting contact 440 selecting remix affordance 430 in FIG. 4C. In FIG. 4M, remix options 460 include: affordance 462 for adding, removing, and/or modifying audio and/or video effect associated with the respective media item; affordance 464 for adding and/or removing one or more video clips associated with the respective media item; and affordance 466 for adding and/or removing one or more audio tracks associated with the respective media item. FIG. 4M also illustrates client device 104 detecting contact 468 at a location corresponding to affordance 466.

For example, after detecting contact 468 selecting affordance 466, in FIG. 4M, to add and/or remove one or more audio tracks associated with the media item presented in FIGS. 4C and 4M, the user of client device selects an audio track from audio library 260 (FIG. 2) or an audio source 124 (FIG. 1) to replace the audio track associated with the respective media item. In this example, the user of client device 104 selects a cover of the audio track associated with the respective media item to replace the audio track associated with the respective media item (e.g., as specified in the metadata structure associated with the respective media item).

Alternatively, in some embodiments, in response to detecting contact 440 selecting remix affordance 430 in FIG. 4C, client device 104 enters a remix mode for editing the respective media item. In the remix mode, client device 104 displays a sequence of representations corresponding to the one or more video clips comprising the respective media item. While in the remix mode, the user of client device 104 is able to remove or reorder video clips associated with the respective media item by performing one or more gestures with respect to the representations in the sequence of representations. Furthermore, while in the remix mode, the user of client device 104 is able to shoot one or more additional video clips, apply different audio and/or video effects, and/or change the audio track associated with the respective media item.

FIG. 4N illustrates client device 104 displaying a preview of the modified media item on touch screen 406 that was created from the media item presented to FIGS. 4C and 4M. In FIG. 4N, the user interface includes back navigation affordance 470, which, when activated (e.g., by a touch input from the user), causes client device 104 to display a previous user interface (e.g., the user interface in FIG. 4M), navigation affordance 418, which, when activated (e.g., by a touch input from the user), causes client device 104 to display a navigation panel for navigating between user interfaces of the application (e.g., one or more of a feed view, user profile, user media items, friends view, exploration view, settings, and so on), and creation affordance 420, which, when activated (e.g., by a touch input from the user), causes client device 104 to display a first user interface of a process for generating a media item. In FIG. 4N, the user interface also includes pre-existing hashtags 428 associated with the respective media item and text entry box 474 for adding a comment or hashtag to the modified media item.

In FIG. 4N, the user interface also includes publish affordance 472, which, when activated (e.g., by a touch input from the user), causes client device 104 to cause the modified media item to be published. FIG. 4N also illustrates client device 104 detecting contact 476 at a location corresponding to publish affordance 472. In some embodiments, client device 104 causes the modified media item to be published by sending, to server system 108, first information identifying the one or more audio tracks (e.g., the selected cover of the audio track associated with the respective media item) associated with the modified media item, second information identifying one or more media files associated with the modified media item, and third information identifying the one or more audio and/or video effects associated with the modified media item.

FIG. 5 is a diagram of representative metadata structure 510 for a media item in accordance with some embodiments. For example, in response to receiving information from a client device indicating that a user of the client device has generated a new media item (e.g., the modified media item generated from the media item presented in FIGS. 4C and 4M), server system 108 or a component thereof (e.g., generating module 324, FIG. 3) generates metadata structure 510. In some embodiments, the received information at least includes first information identifying one or more audio tracks associated with the new media item and second information identifying one or more media files (e.g., one or more video clips and/or a sequence of one or more images) associated with the new media item. In some embodiments, the received information also includes third information identifying one or more audio and/or video effects associated with the new media item. In some embodiments, metadata structure 510 is stored in media item metadata database 116, as shown in FIGS. 1 and 3, and maintained by server system 108 or a component thereof (e.g., maintaining module 320, FIG. 3).

Metadata structure 510 includes a plurality of entries, fields, and/or tables including a subset or superset of the following:

identification tag field 512 includes a unique identifier for the media item;

author field 514 includes the identifier, name, or handle associated with the creator/author of the media item;

date/time field 516 includes a date and/or time stamp associated with generation of the media item;

one or more media file pointer fields 518 including a pointer or link (e.g., a URL) for each of the one or more media files (e.g., one or more video clips and/or a sequence of one or more images) associated with the media item;

one or more audio track pointer fields 520 for each of the one or more audio tracks associated with the media item;

one or more start time fields 521 for each of the one or more audio tracks associated with the media item;

effects table 522 includes an entry 523 for each of zero or more audio and/or video effects to be applied to the media item at run-time upon playback by a subsequent viewer, for example, entry 523-a includes one or more of: the identifier, name, or handle associated with the user who added the effect; the effect type; the effect version; the content (e.g., one or more media files and/or audio tracks) subjected to the effect; a start time (t1) for the effect; an end time (t2) for the effect; one or more preset parameters (p1, p2, . . . ) for the effect; and an effect script or computer-readable instructions for the effect (e.g., GLSL);

interactive effects table 524 includes an entry 525 for each of zero or more interactive audio and/or video effects to be controlled and manipulated at run-time by a subsequent viewer of the media item, for example, the entry 525-*a* includes one or more of: the identifier, name, or handle associated with the user who added the interactive effect; the interactive effect type; the interactive effect version; the content (e.g., one or more media files and/or audio tracks) subjected to the effect; one or more parameters (p1, p2, . . . ) for the interactive effect; a table mapping interactive input modalities to effect parameters; and an effect script or computer-readable instructions for the interactive effect (e.g., GLSL);

play count field 526 includes zero or more entries 528 for each playback of the media item, for example, entry 528-*a* includes: the identifier, name, or handle associated with the user who played the media item; the date and time when the media item was played; and the location where the media item was played;

likes field 530 includes zero or more entries 532 for each like of the media item, for example, entry 532-*a* includes: the identifier, name, or handle associated with the user who liked the media item; the date and time when the media item was liked; and the location where the media item was liked;

shares field 534 includes zero or more entries 536 for each share of the media item, for example, entry 536-*a* includes: the identifier, name, or handle associated with the user who shared the media item; the method by which the media item was shared; the date and time when the media item was shared; and the location where the media item was shared;

comments field 538 includes zero or more entries 540 for each comment (e.g., a hashtag) corresponding to the media item, for example, entry 540-*a* includes: the comment; the identifier, name, or handle associated with the user who authored the comment; the date and time when the comment was authored; and the location where the comment was authored; and associated media items field 542 includes zero or more entries 544 for each media item (e.g., a parent or child media item) associated with the media item, for example, entry 544-*a* corresponding to a parent media item associated with the media item includes: an identification tag for the parent media item; the identifier, name, or handle associated with the user who authored the parent media item; the date and time when the parent media item was authored; and the location where the parent media item was authored.

In some implementations, metadata structure 510, optionally, stores a subset of the entries, fields, and/or tables identified above. Furthermore, metadata structure 510, optionally, stores additional entries, fields, and/or tables not described above.

In some embodiments, effect parameters include, but are not limited to: (x,y) position and scale of audio and/or video effects, edits, specification of interactive parameters, and so on. In some embodiments, media item metadata database 116 stores a metadata structure for each media item generated by a user in the community of users associated with the application. In some embodiments, each media item is associated with a family tree, and each family tree includes a genesis node corresponding to a root media item (e.g., original media item) and a plurality of leaf nodes corresponding to media items that are modified versions of the root media item. In some embodiments, the root media item is a professionally created video (e.g., a music video, film clip, or advertisement) either in "flat" format or in the metadata-annotated format with media items and metadata. In some embodiments, the root media item is associated with audio tracks and/or video clips in reference database 344 (FIG. 3). The root media item is automatically determined and is added to the family tree as the genesis node when a digital fingerprint for the one or more audio tracks and one or more video clips corresponding to a respective media item matches the audio tracks and/or video clips in reference database 344 associated with the root media item.

FIGS. 6A-6D illustrate a flowchart diagram of a method 600 of presenting interactive media items in accordance with some embodiments. In some embodiments, method 600 is performed by an electronic device with one or more processors, memory, and a touch screen display. For example, in some embodiments, method 600 is performed by a mobile device (e.g., client device 104, FIGS. 1-2) or a component thereof (e.g., client-side module 102, FIGS. 1-2). In some embodiments, method 600 is governed by instructions that are stored in a non-transitory computer readable storage medium and the instructions are executed by one or more processors of the electronic device. Optional operations are indicated by dashed lines (e.g., boxes with dashed-line borders).

In some embodiments, the client device detects (602) a touch input on the touch screen display selecting a media item. For example, in FIG. 4A, client device 104 detects contact 422 at a location corresponding to media item affordance 410-*b* to present the media item associated with media item affordance 410-*b*.

In some embodiments, the client device sends (604), to a server, a request for the selected media item in response to detecting the touch input. For example, in response to detecting contact 422, in FIG. 4A, at a location corresponding to media item affordance 410-*b*, client device 104 sends a request to server system 108 requesting the media item that corresponds to media item affordance 410-*b*.

In some embodiments, the client device receives (606), from the server, a metadata structure associated with the selected media item. In some embodiments, the metadata structure associated with the requested media item is stored in media item metadata database 116 (FIGS. 1 and 3) at server system 108. In some embodiments, client device 104 receives, from server system 108, a metadata structure, or a portion thereof, associated with the requested media item (e.g., including information identifying one or more media files associated with the requested media item and information identifying at least a portion of an audio track associated with the requested media item).

In some embodiments, the metadata structure includes (608) first information identifying at least a portion of an audio track associated with the media item, second information identifying one or more media files associated with the media item, and third information identifying one or more audio and/or video effects. In some embodiments, the first information includes a pointer to each of one or more audio tracks associated with the media item, and the second information includes a pointer to each of one or more media files associated with the media item. In some embodiments, a respective pointer to an audio track points to an audio track stored in audio library 260 (FIG. 2) associated with the user of client device 104 or available from one or more audio sources 124, FIG. 1 (e.g., a streaming audio service provider such as Spotify, SoundCloud, Rdio, Pandora, or the like). In some embodiments, a respective pointer to a media file points to a media file stored in media file database 114 or available from one or more media file sources 126, FIG. 1 (e.g., a service provider of images and/or video such as YouTube, Vimeo, Vine, Flickr, Imgur, and the like).

In some embodiments, the third information identifies one or more static or interactive audio and/or video effects associated with the requested media item. In some embodiments, the one or more audio and/or video effects are static, predetermined effects that are stored in effects table 522 in a metadata structure 510, as shown in FIG. 5, and the one or more audio and/or video effects are applied to the one or more media files and/or the portion of the audio track at run-time. In some embodiments, the one or more audio and/or video effects are interactive effects that are stored in interactive effects table 524 in a "in response to determining" or "in accordance with a determination" or "upon detecting" or "in response toe application of one or more audio and/or video interactive effects to the one or more media files and/or the portion of the audio track in real-time upon playback. Storage of the audio and/or video effects in effects table 522 and/or interactive effects table 524 enables the application to maintain original, first generation media files and audio tracks in an unadulterated and high quality form and to provide an unlimited modification functionality (e.g., remix and undo).

For example, client device 104 downloads effects, from server system 108, at run-time including computer-readable instructions or scripts for the effects written in a language such as GLSL, accompanied by effect metadata indicating effect type, effect version, effect parameters, a table mapping interactive modalities (e.g., touch, gesture, sound, vision, etc.) to effect parameters, and so on. In this way, the choice, number, and type of effect can be varied at run-time. In some embodiments, a web-based content management server (CMS) is available for the real-time browser-based authoring and uploading of effects to the server, including real-time preview of effects on video and/or audio (e.g., using technologies such as WebGL). In some embodiments, the audio and/or video effects have interactive components that can specified and customized by authors via the CMS, and then be controlled and manipulated at run-time via user inputs.

In some embodiments, the client device obtains (610) the one or more media files associated with the media item based at least in part on the second information. In some embodiments, in accordance with the second information identifying the one or more media files associated with the media item, client device 104 obtains one or more media files associated with the requested media item from media file database 114 and/or from one or more media file sources 126 (FIG. 1). In some embodiments, client device 104 buffers the one or more media files in video buffer 254 (FIG. 2) for display.

In some embodiments, the client device determines (612) one or more sources for the portion of the audio track associated with the media item based at least in part on the first information. In some embodiments, in accordance with the first information identifying at least the portion of the audio track associated with the media item, client device 104 or a component thereof (e.g., determining module 230, FIG. 2) determines whether the audio track identified by the first information is available in audio library 260 (FIG. 2) and/or from one or more audio sources 124 (FIG. 1). In some embodiments, when the audio track is neither available in audio library 260 nor from one of the one or more audio sources 124, the client device presents the user of client device 104 with the option to buy the audio track from an audio track marketplace (e.g., Amazon, iTunes, etc.). In some embodiments, when the audio track is available from one or more audio sources 124, client device 104 additionally presents the user of client device 104 with the option to buy the audio track and/or to subscribe to one or more audio source 124 from which the audio track is available.

In some embodiments, the client device obtains (614) at least the portion of the audio track associated with the media item from one of the one or more determined sources. In some embodiments, after determining a source for the audio track (e.g., audio library 260 (FIG. 2) and/or one of the one or more audio sources 124 (FIG. 1)), client device 104 or a component thereof (e.g., obtaining module 232, FIG. 2) obtains at least the portion of the audio track from the determined source and buffers at least the portion of the audio track in audio buffer 252 (FIG. 2) for playback.

The client device presents (616) the media item on the touch screen display. The media item is associated with the metadata structure that includes first information identifying at least a portion of an audio track associated with the media item, second information identifying one or more media files associated with the media item, and third information (e.g., effects metadata) identifying one more audio and/or video effects (e.g., static and/or interactive effects).

The presenting includes displaying (618) the one or more media files associated with the media item. In some embodiments, the one or more media files include one or more video clips and/or a sequence of one or more images. For example, in FIG. 4B, client device 104 or a component thereof (e.g., presenting module 234, FIG. 2) displays on touch screen 406 the one or more media files associated with the media item that corresponds to media item affordance 410-*b* selected in FIG. 4A.

The presenting also includes playing back (620) at least a portion of an audio track associated with the media item while displaying the one or more media files, the playback of at least the portion of the audio track is synchronized with the one or more media files. For example, with reference to FIG. 4B, client device 104 or a component thereof (e.g., presenting module 234, FIG. 2) plays back, via one or more speakers 402, at least a portion of an audio track associated with the media item that corresponds to media item affordance 410-*b* selected in FIG. 4A. In some embodiments, client device 104 or a component thereof (e.g., synchronizing module 236, FIG. 2) synchronizes playback of the portion of the audio track with display of the one or more media items by starting playback of the portion of the audio track from the audio playback timestamp identified in the synchronization information (e.g., audio start time field 521, FIG. 5).

While presenting the media item (622), the client devices detects (624) a touch input gesture on the touch screen display. For example, in FIG. 4B, client device 104 detects a left-to-right swipe gesture with contact 436 on touch screen 406. In another example, in FIG. 4B, client device 104 detects a left-to-right swipe gesture with contact 438 on touch screen 406. In another example, in FIG. 4B, client device 104 detects contact 439 (e.g., a press and hold gesture) on touch screen 406. In a further example, in FIG. 4G, client device 104 detects a counter-wise dragging gesture with contact 444 on touch screen 406.

In some embodiments, the touch input gesture activates (626) the audio and/or video effect specified by the third information. For example, the wind effect applied to the one or more media files and the audio track associated with the media item being presented in FIG. 4C is activated by left-to-right swipe gesture with contact 436 in FIG. 4B. In another example, the wind effect applied to the one or more media files and the audio track associated with the media item being presented in FIG. 4D is activated by left-to-right swipe gesture with contact 438 in FIG. 4B. In a further example, the pixelization effect applied to the one or more media files associated with the media item being presented in FIG. 4E is activated by contact 439 in FIG. 4B.

Alternatively, in some embodiments, the audio and/or video effect is automatically applied to the one or more media files and/or the audio track associated with the media item in accordance with one or more predetermined parameters specified in the metadata structure associated with the media item. For example, in FIG. 4G, an interactive swirl effect is automatically applied to the one or more media files associated with the media item being presented. In this example, one or more parameters of the swirl effect, such as direction, radius, speed, and so on, are predetermined by the author of the media item being presented in FIG. 4G. In another example, in FIG. 4J, an interactive ripple effect is automatically applied to the one or more media files associated with the media item being presented. In this example, one or more parameters of the ripple effect, such as wave type, orientation, frequency, amplitude, and so on, are predetermined by the author of the media item being presented in FIG. 4J.

While presenting the media item (622), the client device applies (628) an audio and/or video effect specified by the third information to the audio track being played back and/or at least a portion of the one or more media files being displayed in response to detecting the touch input gesture. In some embodiments, the interactive audio and/or video effects and one or more corresponding parameters are predetermined by the author of the media item and specified in the metadata structure associated with the media item (e.g., in effects table 522 and/or interactive effects table 524, FIG. 5). Alternatively, in some embodiments, the user of client device 104 selects an effect from a menu of interactive effects specified in the metadata structure associated with the media item. In some embodiments, the interactive effects are activated by a touch input. Alternatively, in some embodiments, the interactive effects are automatically applied to the one or more media files and/or audio track associated with the media item. Alternatively, in some embodiments, the interactive effects are automatically applied to the one or more media files and/or audio track associated with the media item, and the effect parameters are varied based on automatic analysis of audio or video media items such as audio beat detection or volume, or video movement or color, etc.

For example, in response to detecting the left-to-right swipe gesture with contact 436 in FIG. 4B, the interactive wind effect is applied to the one or more media files and audio track associated with the media item being presented in FIG. 4C. In another example, in response to detecting the left-to-right swipe gesture with contact 438 in FIG. 4B, the interactive wind effect is applied to the one or more media files and audio track associated with the media item being presented in FIG. 4D. In another example, in response to detecting contact 439 in FIG. 4B, the pixelization effect is applied to the one or more media files associated with the media item being presented in FIG. 4E. In a further example, the ripple effect is automatically applied to the one or more media files associated with the media item being presented in FIG. 4J. Continuing with this example, in response to detecting the pinch gesture with contacts 454 and 456 in FIG. 4J, the frequency of the sine waves associated with the ripple effect being applied to the one or more media files associated with the media item being presented in FIG. 4K are increased (i.e., compared to the frequency in FIG. 4J).

In some embodiments, the audio and/or video effect is applied (630) (e.g., in real-time) to the portion of the audio track being played back and/or at least the portion of the one or more media files being displayed based at least in part on one or more characteristics of the detected touch input gesture. For example, the one or more characteristics include: the gesture type, (x,y) position of the gesture or contact, number of contacts for a multi-contact (or multi-finger) gesture, distance between contacts for a multi-contact (or multi-finger) gesture, pressure of a contact, distance covered between touch-down and lift-off of contact(s) performing a gesture, velocity and/or acceleration of a gesture, change in velocity and/or acceleration of a gesture, and so on. In some embodiments, the location contacts comprising the touch input gesture are mapped to effects. In one example, in response to left-to-right swipe gesture with contact 436 in FIG. 4B, the wind effect is applied to the one or more media files associated with the media item being presented in FIG. 4C in a left-to-right direction. In another example, with respect to FIGS. 4C-4D, the magnitude of the wind effect's impact on the one or more media files and the audio track associated with the respective media item is greater in FIG. 4D than in FIG. 4C because the distance of the swipe gesture with contact 438 in FIG. 4B is greater than the distance of the swipe gesture with contact 436 in FIG. 4B.

In some embodiments, the one or more characteristics of the detected touch input gesture include (632) at least one of a location of the input gesture and a gesture type associated with the input gesture. For example, in FIG. 4K, the frequency of the sine waves associated with the ripple effect applied to the one or more media files associated with the media item being presented are increased (i.e., compared to the frequency in FIG. 4J) in response to detecting the pinch gesture in FIG. 4J. In this example, a pinch gesture increases the frequency of the sine waves associated with the ripple effect, and, conversely, a de-pinch gesture that is substantially opposite to the pinch gesture decreases the frequency of the sine waves associated with the ripple effect. Continuing with this example, a different gesture type, such as a substantially semicircular clockwise or counter-clockwise dragging gesture, changes the orientation of the sine waves associated with the ripple effect (e.g., from a horizontal to vertical orientation), and another gesture type, such as a substantially left-to-right or right-to-left swipe gesture, changes the wave type associated with the ripple effect (e.g., from a sine to sawtooth waveform).

In some embodiments, the audio and/or video effect modifies (634) one or more parameters of the one or more media files being displayed on a pixel-by-pixel basis. In some embodiments, the audio and/or video effect varies the color, brightness, saturation, texture overlay, etc. of the one or more media files associated with the media item being displayed based on the coordinates of the touch input gesture. For example, pixels of the one or more media files associated with the media item being presented that are within a predetermined radius from the (x,y) coordinates of a detected contact (e.g., a tap gesture) are affected by a brightness or saturation effect.

In some embodiments, the audio and/or video effect modifies (636) geometry of at least the portion of the one or more media files being displayed based at least in part on a predetermined form of geometric distortion. In some embodiments, a mathematical function or a lookup table mapping from source (x,y) pixel positions to destination (x,y) pixel positions is used. For example, in FIGS. 4G-4I, a swirl effect distorts the geometry of at least the portion of the one or more media files being displayed, and, in FIGS. 4J-4L, a ripple effect distorts the geometry of at a least the portion of the one or more media files being displayed. In another embodiment, previously recorded, or real-time readings of the accelerometer rotate the orientation of the video during playback (e.g. in a web-based media player) to present the preferred orientation of the video to the user at all times.

In some embodiments, the audio and/or video effect modifies the temporal order or speed of the portion of the audio track being played back and/or the one or more media files being displayed. For example, the frame rate of the one or more media files being displayed are increased or decreased according to a detected touch input gesture. As such, an interactive slow-motion or fast-motion (i.e., undercranking) effect is applied to the media item and is controlled by the viewer at run time.

In some embodiments, when the one or more video clips corresponding to a media item are shot in more than one orientation, client-side module 102 or a web-based media player associated with the application is configured to present the preferred orientation of the video clips to the user at all times. For example, a video clip corresponding to a media item includes an initial 5 seconds shot in portrait orientation, the next 15 seconds shot in landscape orientation, and the final 40 seconds shot in portrait orientation. Continuing with this example, during presentation of the media item, client-side module 102 or the web-based media player associated with the application presents the video clip in the preferred orientation by seamlessly adapting the aspect ratio and/or resolution of the video clip in real time to conform to real-time readings of the accelerometer associated with client device 104. As such, if readings from the accelerometer indicate that client device 104 is in portrait orientation, the video clip is always presented in portrait orientation regardless of the orientation in which the video clip was shot. In this way, presentation of the media item is not a jarring experience for the user of client device 104.

In some embodiments, the audio and/or video effect modifies (638) the audio track being played back with one or more digital signal processing filters. For example, when an interactive auto-tuner effect is specified in the metadata structure associated with the media item being presented, touch input gestures on the user interface modulate the audio track associated with the media item being presented with a digital signal processing filter corresponding to the auto-tuner effect. In another example, when an interactive wah-wah pedal effect is specified in the metadata structure associated with the media item being presented, touch input gestures on the user interface modulate the audio track associated with the media item being presented with a digital signal processing filter corresponding to the wah-wah effect.

In some embodiments, the audio and/or video effect generates (640) synthetic music based on one or more algorithms for automated music production. In some embodiments, an audio effect allows the user of client device 104 to input a number of stems from an original audio track used to create a song. For example, the effect allows the different stems to be turned on or off, and to apply volume adjustments and effects to the stems, when the user remixes a song. In some embodiments, an audio effect comprises a MIDI description of notes, phrases, instruments, and samples, along with computer-readable code to algorithmically combine these elements into music in the style of a particular musical artist, yet with new structure, notation, effects, or timing produced by interacting with the effect at run time.

In some embodiments, the audio and/or video effect generates (642) musical information via one or more synthesized instruments based at least in part on one or more characteristics of the touch input gesture (e.g., the type or location of the touch input gesture and quality of movement). For example, while presenting the media item associated with affordance 410-b selected in FIG. 4A, the user interface in FIG. 4B behaves like an instrument to produce musical notes. Continuing with this example, when an interactive guitar effect is specified in the metadata structure associated with the media item being presented, touch gestures on the user interface in FIG. 4B resembling guitar strumming generate corresponding musical notes via a synthesized guitar.

In some embodiments, one or more characteristics of the touch input gesture identify (644) the portion of the audio track being played back and/or the one or more media files being displayed. For example, one or more characteristics of the touch input gesture, such as gesture type, direction, and so on, produce a video and/or audio experience whose narrative flow changes based on subsequent touch input gestures (e.g., akin to a choose your own adventure story). For example, the effect can make choices of which audio track and/or video clips to play based on touch input gestures such as choosing whether two characters in a video or animation fall in love, whether a character dies, whether a planet is destroyed or saved, etc. In another example, the narrative is synthetically generated computer graphic imagery resembling a photo realistic (e.g. Avatar) or cartoon-like (e.g. Toy Story) narrative that is generated in real-time. The touch input gestures determine the movements, narrative choices, and other story elements within a computer-generated interactive narrative, similar to those experienced by video games such as Grand Theft Auto when played in "world exploration" mode. As such, the media item corresponds to the narrative experience comprising any combination of the one or more media items, the audio track, or synthetic computer-generated material.

In some embodiments, one or more characteristics of the touch input gesture determine (646) choices in a video-game experience, where the media item corresponds to the video-game experience. For example, the user of client device 104 attempts to match a visual display of what note is being played. In another example, the user of client device 104 attempts to tap at the same tempo as a song. In a further example, the user of client device 104 plays a game in which accumulated points unlock audiovisual and interactive elements within the audiovisual experience. In another example, an effect could be an elaborate world exploration video game (e.g., Grand Theft Auto or a massive multiplayer online game (MMO) such as World of Warcraft) and the soundtrack to the visuals changes based on the game play and situations encountered.

In some embodiments, the portion of the audio track being played back and/or at the one or more media files being displayed are partially or completely generated (648) synthetically in real time. In one example, a particle system (e.g., a visualizer) responds to the audio track associated with the media item and changes based on detected touch input gestures. In another example, interactive songs and instruments, whose structure, timbre, tempo, or other qualities are synthetically generated at run-time are varied based on touch input gestures. In a further example, one or more synthetic 3D characters are displayed based on the audio track associated with the media item. In this example, the one or more synthetic 3D characters are programmed to dance and/or lip-sync to the audio track. Continuing with this example, the one or more synthetic 3D characters respond/react to touch input gestures. Further continuing with this example, the one or more synthetic 3D characters are customizable, for example, the user of client device 104 is able to choose different attributes for the look and movement of the synthetic 3D character.

In some embodiments, the client device displays (650) one or more controls for the audio and/or video effect overlaying the displayed one or more media files (e.g., user interface components such as a slider, intensity bar, knob, pedal, turntable, etc.). For example, in FIGS. 4J-4L, the user interface includes effect modulator 452 for modulating (e.g., in real-time) one or more parameters of the ripple effect being applied to the one or more media files associated with the media item being presented in FIGS. 4J-4L. For example, in FIGS. 4J-4L, effect modulator 452 is a slider that increases the amplitude of the sine waves associated with the ripple effect when slid left-to-right and decreases the amplitude of the sine waves associated with the ripple effect when slid right-to-left. In some embodiments, a control modulates more than one parameter of the interactive audio and/or video effect to simplify the user experience. Alternatively, in some embodiments, controls for the audio and/or video effect are not displayed on touch screen 406 but, instead, the audio and/or video effect responds to user input gestures detected on touch screen 406.

In some embodiments, after applying the audio and/or video effect, the client device detects (652) a second input gesture, and, in response to detecting the second touch input gesture, the client device modifies one or more parameters of the audio and/or video effect being applied based at least in part on the second input gesture. In some embodiments, the first touch input gesture starts/applies a first level of the effect and the second touch input gesture further alters or defines the effect. For example, contact 439 in FIG. 4B activates the pixelization effect applied to the one or more media files associated with the media item being presented in FIG. 4E. Continuing with this example, in response to detecting contact 442 in FIG. 4E, the magnitude of the pixelization effect's impact on the one or more media files associated with the media item being presented in FIG. 4F is increased (i.e., compared to its magnitude in FIG. 4E).

In some embodiments, the client device detects (654) one or more second touch inputs, and, in response to detecting the one or more second touch inputs, the client device modifies the media item based on the one or more second touch inputs. For example, client device 104 detects contact 468 selecting affordance 466, in FIG. 4M, to add and/or remove one or more audio tracks associated with the media item presented in FIGS. 4C and 4M. Continuing with this example, client device 104 detects one or more second touch inputs selecting a cover audio track from audio library 260 (FIG. 2) or one or the one or more audio sources 124 (FIG. 1) to replace the audio track associated with the media item. Further continuing with this example, client device 104 creates a modified media item based on the media item presented in FIGS. 4C and 4M with the selected cover audio track.

In some embodiments, the client device publishes (656) the modified media item with attribution to an author of the media item. For example, in response to the one or more second user inputs modifying the media item presented in FIGS. 4C and 4M by selecting a cover audio track, client device 104 publishes the modified media item by sending, to server system 108, first information identifying the one or more audio tracks associated with the modified media item (e.g., the selected cover of the audio track associated with the media item presented in FIGS. 4C and 4M), second information identifying one or more media files associated with the modified media item, and third information identifying the one or more audio and/or video effects associated with the modified media item. In some embodiments, attribution is given to an author of individual new or modified media items and metadata. For example, with reference to FIG. 5, each entry 523 in effects table 522 and each entry 525 in interactive effects table 524 includes the identifier, name, or handle associated with the user who added the effect.

It will be understood that, although the terms "first," "second," etc. may be used herein to describe various elements, these elements should not be limited by these terms. These terms are only used to distinguish one element from another. For example, a first touch input could be termed a second touch input, and, similarly, a second touch input could be termed a first touch input, without changing the meaning of the description, so long as all occurrences of the "first touch input" are renamed consistently and all occurrences of the "second touch input" are renamed consistently. The first touch input and the second touch input are both touch inputs, but they are not the same touch input.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of presenting interactive media items, comprising:
    at a server system, receiving information associated with an interactive media item, the information associated with the interactive media item including information identifying an audio file, information identifying at least one visual media file, and information on one or more effects; and publishing, by the server system, the interactive media item, the publishing comprising providing access for a playback of the interactive media item based on metadata for the interactive media item, the metadata for the interactive media item generated using the information associated with the interactive media item and including a mapping of an effect parameter for a first effect of the one or more effects to a touch input gesture, wherein the playback comprises:

in response to user selection of the interactive media item, presenting the interactive media item on a display; and in response to detecting a first user input gesture corresponding to the touch input gesture, applying the first effect to the presented interactive media item, the applying of the first effect comprising determining the effect parameter according to one or more characteristics of the first user input gesture, based on the mapping of the effect parameter to the touch input gesture.

2. The method of claim 1, wherein presenting the interactive media item comprises:

concurrently playing back at least a portion of the audio file in synchronization with display of the at least one visual media file.

3. The method of claim 2, wherein applying the first effect to the presented interactive media item comprises applying the first effect to at least one of:

the at least a portion of the audio file being played back; and at least a portion of the at least one visual media file being displayed.

4. The method of claim 1, further comprising obtaining, from the metadata for the interactive media item, metadata information identifying the one or more effects and linking at least one effect of the one or more effects to a particular gesture type, the metadata information including the mapping of the effect parameter to the touch input gesture.

5. The method of claim 1, further comprising, providing, by the server system, the one or more effects in connection with the presenting of the interactive media item.

6. The method of claim 1, further comprising obtaining the metadata for the interactive media item in connection with the presenting of the interactive media item, the metadata including first information identifying a first location corresponding to the audio file, second information identifying a second location corresponding to the one or more visual media files, and third information identifying the one or more effects.

7. The method of claim 6, further comprising:

obtaining at least a portion of the audio file from the first location based on the first information; and obtaining the at least one visual media file based on the second information.

8. The method of claim 1, wherein the one or more effects are controllable using one or more controls on an overlay of the presented interactive media item.

9. The method of claim 1, wherein the effect parameter of the first effect is modified according to one or more characteristics of a second user input gesture corresponding to the touch input gesture, the second user input gesture occurring after the first user input gesture.

10. The method of claim 1, wherein the one or more effects are selected from a group comprising:

one or more audio effects;
  one or more visual effects; and
  one or more audiovisual effects.

11. The method of claim 1, wherein the one or more characteristics of the first user input gesture include at least one of: a location of the first user input gesture, and a gesture type of the first user input gesture.

12. The method of claim 1, wherein the first effect modifies one or more parameters of the presented interactive media item on a pixel-by-pixel basis.

13. The method of claim 1, wherein the first effect modifies a geometry of at least a portion of the presented interactive media item based at least in part on a predetermined form of geometric distortion.

14. The method of claim 1, wherein the first effect modifies the temporal order or speed of at least a portion of the presented interactive media item.

15. The method of claim 1, wherein the first effect modifies at least a portion of presented interactive media item with one or more digital signal processing filters.

16. The method of claim 1, wherein the first effect generates synthetic music based on one or more algorithms for automated music production.

17. The method of claim 1, wherein the first effect generates musical information via one or more synthesized instruments based at least in part on one or more characteristics of the first user input gesture.

18. The method of claim 1, wherein at least a subset of the one or more characteristics of the first user input gesture determines a choice in a video-game experience, wherein the interactive media item corresponds to the video-game experience.

19. The method of claim 1, further comprising:

storing, by the server system, the metadata for the interactive media item in a metadata database in response to the receiving of the information associated with the interactive media item.

20. A server system, comprising:

one or more processors; and memory storing one or more programs to be executed by the one or more processors, the one or more programs comprising instructions for:

receiving information associated with an interactive media item, the information associated with the interactive media item including information identifying an audio file, information identifying at least one visual media file, and information on one or more effects; and publishing, by the server system, the interactive media item, the publishing comprising providing access for a playback of the interactive media item based on metadata for the interactive media item, the metadata for the interactive media item generated using the information associated with the interactive media item and including a mapping of an effect parameter for a first effect of the one or more effects to a touch input gesture, wherein the playback comprises:

in response to user selection of the interactive media item, presenting the interactive media item on a display; and in response to detecting a first user input gesture corresponding to the touch input gesture, applying the first effect to the presented interactive media item, the applying of the first effect comprising determining the effect parameter according to one or more characteristics of the first user input gesture, based on the mapping of the effect parameter to the touch input gesture.

21. A non-transitory computer readable storage medium storing one or more programs, the one or more programs comprising instructions, which, when executed by one or more processors, cause the one or more processors to:

receive information associated with an interactive media item, the information associated with the interactive media item including information identifying an audio file, information identifying at least one visual media file, and information on one or more effects; and publish the interactive media item, the publishing comprising providing access for a playback of the interactive media item based on metadata for the interactive media item, the metadata for the interactive media item generated using the information associated with the interactive media item and including a mapping of an effect parameter for a first effect of the one or more effects to a touch input gesture, wherein the playback comprises:

in response to user selection of the interactive media item, presenting the interactive media item on a display; and in response to detecting a first user input gesture corresponding to the touch input gesture, applying the first effect to the presented interactive media item, the applying of the first effect comprising determining the effect parameter according to one or more characteristics of the first user input gesture, based on the mapping of the effect parameter to the touch input gesture.

* * * * *

UNITED STATES PATENT AND TRADEMARK OFFICE
CERTIFICATE OF CORRECTION

PATENT NO. : 10,120,565 B2
APPLICATION NO. : 14/933940
DATED : November 6, 2018
INVENTOR(S) : Scott Snibbe et al.

It is certified that error appears in the above-identified patent and that said Letters Patent is hereby corrected as shown below:

In the Specification

Column 17, Line 13, replace "effects table 524 in a "in response to determining"" with --effects table 524 "in response to determining"--, therefor.

Column 17, Line 14, delete "or "in response toe" and insert --or in response to--, therefor.

Signed and Sealed this
Twenty-second Day of January, 2019

Andrei Iancu
*Director of the United States Patent and Trademark Office*